US006523861B1

(12) United States Patent
Clancy et al.

(10) Patent No.: US 6,523,861 B1
(45) Date of Patent: Feb. 25, 2003

(54) FLUID COUPLING AND METHOD OF USE

(76) Inventors: Gary Clancy, P.O. Box, Santa Barbara, CA (US) 93101; Robert Haake, P.O. Box, Santa Barbara, CA (US) 93101

( * ) Notice: Subject to any disclaimer, the term of this patent is extended or adjusted under 35 U.S.C. 154(b) by 0 days.

(21) Appl. No.: 09/668,413

(22) Filed: Sep. 22, 2000

Related U.S. Application Data

(63) Continuation of application No. 09/085,382, filed on May 26, 1998, now abandoned.

(51) Int. Cl.[7] ............................................. F16L 39/00
(52) U.S. Cl. ........................ 285/93; 285/316; 285/924; 285/914; 285/330
(58) Field of Search ...................... 251/149.1; 285/314, 285/316, 93, 330, 914, 924

(56) References Cited

U.S. PATENT DOCUMENTS

| 114,575 | A | * | 5/1871 | Lovell ........................ 285/314 |
|---|---|---|---|---|
| 464,386 | A | * | 12/1891 | Patterson .................... 285/314 |
| 655,672 | A | | 8/1900 | Engel |
| 665,252 | A | | 1/1901 | Morawetz |
| 729,145 | A | | 5/1903 | Eckennwiler |
| 850,070 | A | | 4/1907 | Spikes |
| 928,813 | A | | 7/1909 | Spikes |
| 1,304,390 | A | | 5/1919 | Semenow et al. |
| 1,371,882 | A | | 3/1921 | Ferguson et al. |
| 1,879,364 | A | * | 9/1932 | Lomar ........................ 285/314 |
| 2,006,833 | A | | 7/1935 | Jensen |
| 2,187,389 | A | | 1/1940 | Winkler |
| 2,470,256 | A | | 5/1949 | McIlroy |
| 2,790,571 | A | | 4/1957 | Flaith et al. |
| 3,005,475 | A | | 10/1961 | Beall |
| 3,035,603 | A | | 5/1962 | Jamieson et al. |

(List continued on next page.)

FOREIGN PATENT DOCUMENTS

| CA | 670440 | 9/1963 |
|---|---|---|
| CS | 77828 | 8/1949 |
| DE | 1218237 | 6/1966 |
| EP | 372373 | 6/1990 |
| FR | 2625545 | 7/1989 |
| GB | 771968 | 4/1957 |
| NO | 64829 | 5/1942 |
| NO | 67082 | 11/1943 |

*Primary Examiner*—Eric K. Nicholson
(74) *Attorney, Agent, or Firm*—Leo F. Costello

(57) ABSTRACT

A fluid coupling including coded and non-coded embodiments and a method for their use. The coded embodiment allows connection of such lines while preventing the inadvertent connection of mismatched lines in a system where there are matched and mismatched delivery and supply lines. Both embodiments of the coupling include axially movable first and second coupling members and a radially operating latch. The coupling members are releasably slideably, axially interfitted with their fluid passageways in communication, and the latch moves radially of the passageways to secure the couplings when they are interfitted. In the coded embodiment, key coding elements on the coded coupling members are movable into matched interengagement when the supply and delivery lines are matched but are precluded from moving into matched interengagement when the lines are mismatched. If a match exists, the coding elements interfit by limited rotation of one of the key coding elements but without rotation of the coupling members and without any threading action of the parts. A mechanism latches the couplings together when the key coding elements match and allow the coupling members to interfit but does not latch when the key coding elements do not match and thus do not allow an interfit. In both embodiments, the coupling members are uncoupled solely by axial separation of the parts, again with out threading, and in the case of the first embodiment, without even any rotation of the parts. In both cases, therefore, neither the coupling members, the coding elements, nor the latch involves threaded connections, whether for connection or disconnection or for latching or unlatching.

58 Claims, 10 Drawing Sheets

U.S. PATENT DOCUMENTS

| | | | |
|---|---|---|---|
| 3,065,885 A | | 11/1962 | Chatten |
| 3,083,042 A | * | 3/1963 | Collar ........................ 285/314 |
| 3,170,667 A | | 2/1965 | Szohatzky |
| 3,191,972 A | * | 6/1965 | Collar ........................ 285/314 |
| 3,301,578 A | | 1/1967 | Platt et al. |
| 3,351,359 A | | 11/1967 | Ferraris |
| 3,361,152 A | | 1/1968 | Akers |
| 3,441,055 A | * | 4/1969 | Pickell ........................ 285/314 |
| 3,670,929 A | | 6/1972 | Berry |
| 3,861,569 A | | 1/1975 | Johnston |
| 4,080,737 A | | 3/1978 | Fleer |
| 4,089,444 A | | 5/1978 | Shea |
| 4,134,522 A | | 1/1979 | Patzke et al. |
| 4,150,673 A | | 4/1979 | Watt |
| 4,211,439 A | | 7/1980 | Moldestad |
| 4,411,287 A | | 10/1983 | Hyde |
| 4,436,125 A | | 3/1984 | Blenkush |
| 4,529,105 A | | 7/1985 | Lewins |
| 4,619,640 A | | 10/1986 | Potolsky |
| 4,665,960 A | | 5/1987 | Brzezicki et al. |
| 4,699,298 A | | 10/1987 | Grant et al. |
| 4,790,567 A | | 12/1988 | Kawano et al. |
| 4,804,208 A | | 2/1989 | Dye |
| 4,907,019 A | | 3/1990 | Stephens |
| 5,052,725 A | | 10/1991 | Meyer et al. |
| 5,108,015 A | | 4/1992 | Rauworth et al. |
| 5,971,019 A | | 10/1999 | Imai |
| 6,007,107 A | * | 12/1999 | Kazarian ................. 285/120.1 |

* cited by examiner

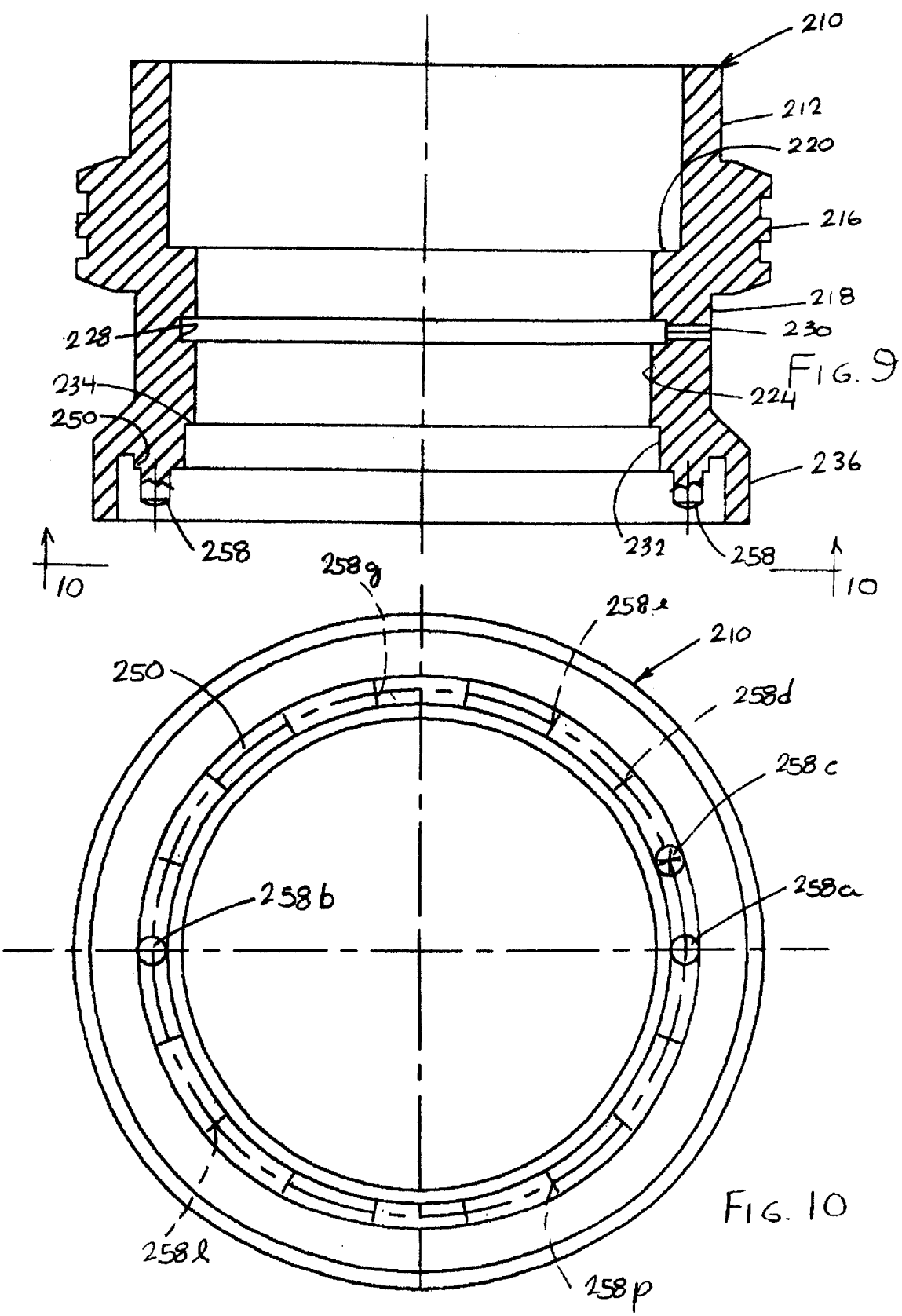

FLUID COUPLING AND METHOD OF USE

RELATED APPLICATION

This application is a continuation of our prior application Ser. No. 09/085,382, filed May 26, 1998 now abandoned, originally entitled Quick-Connect Coupling and amended to be entitled Coupling.

FIELD OF THE INVENTION

The present invention pertains to a fluid coupling and more particularly to a fluid coupling having coupling members that are quickly connectable and disconnectable and also to a coded fluid coupling that is quickly connectable and latchable but only if the coupling members match and to a method for their use.

BACKGROUND

In various industries, it is necessary to use many chemicals in the manufacturing process. In the semiconductor industry, for example, some fifteen to twenty liquid chemicals are typically stored in adjacent fifty-gallon supply drums from which they are dispensed during the manufacture of the semiconductors. In the usual installation, sets of separate umbilical delivery lines for various chemicals are suspended above the drums with a particular set dedicated to a particular chemical. Each set of delivery lines is connected to its associated supply drum by a coupling that has one coupling member on the delivery lines and a second coupling member on the drum.

As each supply drum is emptied during the manufacturing process, a full drum is brought in to replace the empty one. Accordingly, the coupling members must be repeatedly connected and disconnected. Because of the incompatibility of the chemicals, it is critical that each set of delivery lines be connected only to its intended drum to avoid unsafe mixing and undesired contamination. Moreover, to maintain productivity, such connections and disconnections must be made quickly and routinely by production personnel.

To insure correct connection of delivery lines to their intended supply drums, the known chemical extraction apparatus uses fluid couplings that incorporate matching coding elements on the coupling members. Examples of such fluid couplings and their coding devices are shown and described in the U.S. Pat. No. 4,699,298 to Grant et al. and U.S. Pat. No. 5,108,015 to Rauworth et al. A significant disadvantage of these known couplings, however, is that they cannot be as quickly connected and disconnected as is desired. Although referred to as quick-connect couplings, they use threaded parts to secure the connection. Repeated threading and unthreading of couplings over a production run consumes a significant amount of valuable time and also can produce additional delays if the threads become fouled and otherwise fail to mesh properly.

Fluid couplings that can be connected and disconnected without threading are of course available and are truly quick-connect and -disconnect couplings. Examples of known quick-connect couplings are disclosed in U.S. Pat. No. 4,436,125 to Blenkush and U.S. Pat. No. 5,052,725 to Meyer et al. Such known couplings of this type, however, are not suitable for the chemical extraction industry or other industries where matched connections are mandatory since they make no provision for coding, that is, insurance against making mismatches. Moreover, the latching mechanisms used in such known quick-connect couplings do not lend themselves to balanced and dependable two-handed operation by personnel in production processes such as described above.

The copending reissue application of Kazarian, Application Ser. No. 091693,627, filed Oct. 20, 2000 which is a reissue of U.S. Pat. No. 6,007,107 granted Dec. 28, 1999 which is based on Kazarian Application Ser. No. 08/683,516, filed Jul. 12, 1996, entitled Fluid Coupling For Matching Delivery and Supply Lines Irrespective Of The Relative Rotational Positions Of The Coupling Members, and having a common assignee with the present application, is one solution to the problems set forth above. The invention of the present application provides an alternative solution.

SUMMARY

A fluid coupling including coded and non-coded embodiments and a method for their use are provided. The coded embodiment allows interconnection of only matching fluent material delivery and supply lines while preventing the inadvertent connection of mismatched lines in a system where there are matched and mismatched delivery and supply lines. Both embodiments of the coupling include axially movable first and second coupling members and a radially operating latch. The coupling members are releasably slideably, axially interfitted with their fluid passageways in communication, and the latch moves radially of the passageways to secure the couplings when they are intermitted. In the coded embodiment, key coding elements on the coded coupling members are movable into matched interengagement when the supply and delivery lines are matched but are precluded from moving into matched interengagement when the lines are mismatched. If a match exists, the coding elements interfit by limited rotation of one of the key coding elements but without rotation of the coupling members and without any threading action of the parts. A mechanism latches the couplings together when the key coding elements match and allows the coupling members to interfit but does not latch when the key coding elements do not match and thus do not allow an interfit. In both embodiments, the coupling members are uncoupled solely by axial separation of the parts, again with out threading, and in the case of the first embodiment, without even any rotation of the parts. In both cases, therefore, neither the coupling members, the coding elements, nor the latch involves threaded connections, whether for connection or disconnection or for latching or unlatching.

An object of this invention is to provide an improved fluid coupling.

Another object is to provide a coded quick-connect and disconnect coupling for use in a chemical extraction system involving supply drums of chemicals and separate delivery lines suspended above the drums.

A further object is to improve the productivity and safety of dispensing a plurality of incompatible chemicals through different delivery lines from different supply drums in a manufacturing process.

A still further object is to provide a simplified coupling that enables dependable quick connection and quick disconnection of the coupling members.

Additionally, an object is to reduce the manufacturing costs of a quick-connect coupling.

Another object is to provide an interactive key coding system and latching mechanism in a quick-connect coupling wherein the coupling members cannot be coupled and latched unless they match.

Yet another object is to provide a simplified quick-connect coupling that does not involve threading or unthreading of the parts.

An additional object is to provide a coupling for supply and delivery lines that allows establishing a coupling without twisting of the lines or relative rotation of the coupling members or threading of the parts and without regard to the relative rotational positions of the coupling members prior to or during interfitting thereof.

A still further object is to provide a key-coded, quick-connect coupling that does not require swiveling of its coupling members for connection but permits the parts being coupled to swivel relative to each other without affecting the rapidity of interconnecting matched coupling members and without affecting the operation of coupling.

Another object is to minimize the time required dependably to connect and disconnect matched coupling members of a coded coupling or to determine that the coupling members are mismatched and will not couple.

An additional object is to provide a key coding system for a coupling that can handle many different combinations of matches and mismatches.

Yet another object is to provide a balanced coding system for a coded quick-connect coupling that lends itself to two-handed operation by a user.

A still further object is to provide an indicator that allows an operator to confirm whether the coupling members are matched and interfitted or whether they are mismatched and not interfitted.

Another object is to isolate the coding and latching elements of a quick-connect coupling from the fluids carried by the coupling and to provide such elements with protection from the fluids.

An additional object is provide a quick-connect fluid coupling in which latching members are captured in the coupling by the assembly thereof.

A further object is to provide a method for using the couplings disclosed herein.

These and other objects, features and advantages of the present invention will become apparent upon reference to the following description, accompanying drawings, and appended claims.

DESCRIPTION OF THE DRAWINGS

FIG. 9 is a somewhat reduced, longitudinal section of the coded latching sleeve shown in FIG. 4a but separated from the extractor head.

FIG. 10 is a bottom plan view of the coded latching sleeve taken from a position indicated by line 10—10 in FIG. 9.

FIG. 11 is a side elevation of a coil spring employed in the present invention although enlarged from FIGS. 2 through 4a.

DETAILED DESCRIPTION

A preferred embodiment of the coded fluid coupling of the present invention is generally indicated by the numeral 25 in FIGS. 1 through 4. The coupling is both a "quick-connect" and a "quick-disconnect" coupling. As is well known, such expressions as "quick-connect," "quick-disconnect," and "quick-release" couplings are commonly used to mean a coupling that has both quick-connecting and quick-disconnecting capabilities. Accordingly, the expression "quick connect" coupling is used herein to mean a coupling that is both quick to connect and quick to disconnect without repeating the word "disconnect" every time.

The subject coupling 25 (FIGS. 1 and 2) is particularly suited for use in conducting chemicals in the semiconductor industry where a variety of highly corrosive and incompatible chemicals are used. Such chemicals include ammonium hydroxide; hydrogen peroxide; and hydrofluoric, phosphoric, nitric, hydrochloride and sulfuric acids. These chemicals are typically stored in a fifty-five gallon drum, as 27, as more fully illustrated in U.S. Pat. No. 5,108,015. The system employed in the semiconductor industry for supplying these chemicals may involve from fifteen to twenty of the drums with each drum containing a particular chemical.

Figure 1:
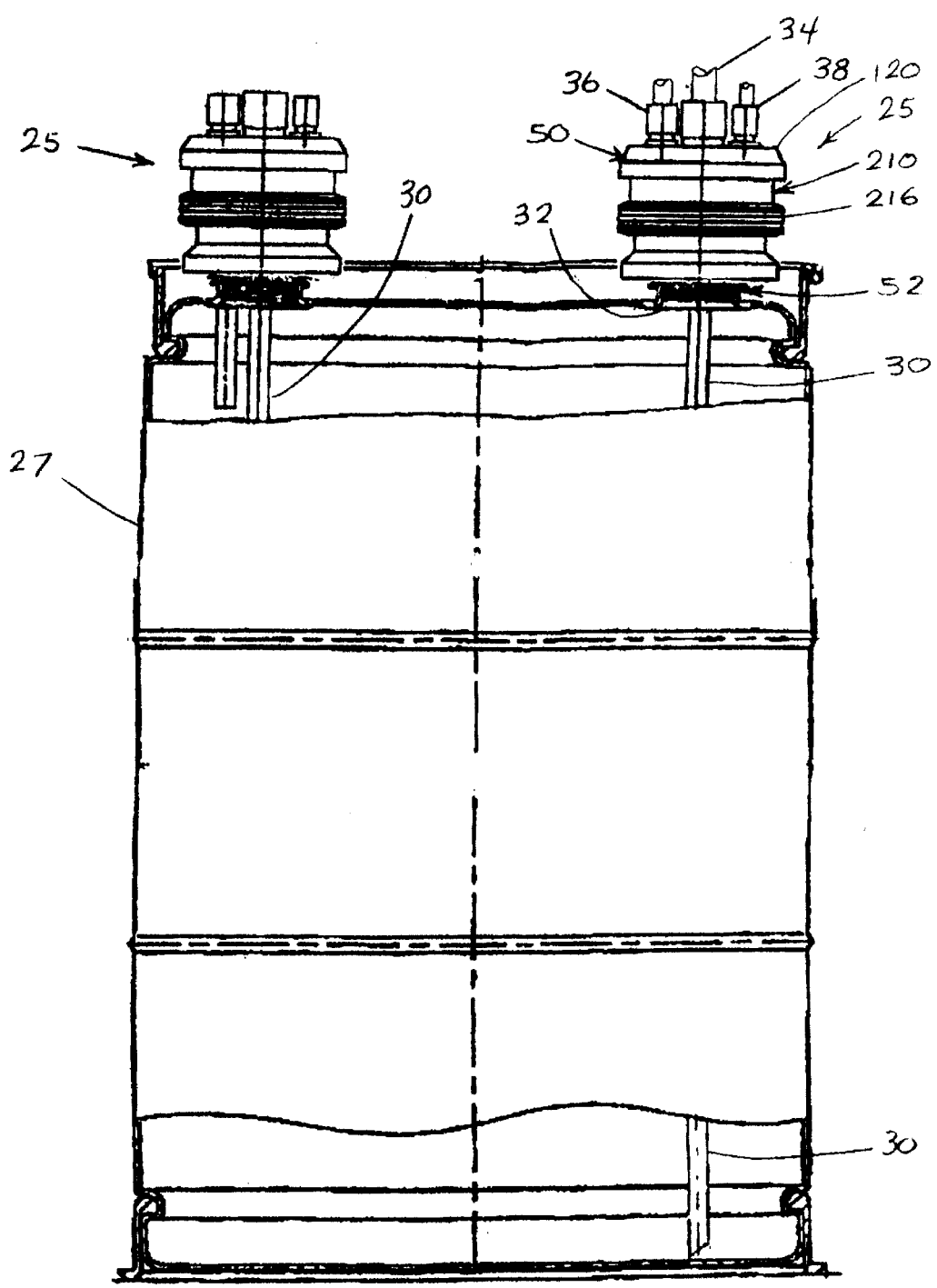
FIG. 1 is a side elevation of a supply drum (partially broken away) and umbilical delivery lines of a chemical extraction system and showing a side elevation of coded quick-connect fluid coupling in accordance with the present invention mounted on the drum and interconnecting the drum and the delivery lines.

The chemical extraction system or apparatus generally indicated in FIG. 1 includes a chemical supply or down tube or line 30 immersed in the chemical of one of the drums and extending up to the bung hole generally indicated at 32. The extraction system also includes a chemical delivery line or hose 34 and an air or nitrogen feed line or hose 36, each of which is connected to the coded quick-connect coupling 25. An air indicator or sensor line or hose 38 is also connected to the coupling for a purpose to be described. The chemical delivery hose 34 extends from the drum to the work area of the semiconductor plant where the chemical in that drum is to be used. The hoses 36 and 38 respectively extend to sources of nitrogen and air under pressure, not shown.

As is well known, the hoses 34 and 36 associated with each chemical are suspended in an umbilical fashion above the drums 27 and are connected to their respective drums by a fluid coupling which in the present case is the coupling 25.

The hose 38 is similarly suspended and connected. The subject coupling allows for the quick and dependable disconnection and reconnection of these umbilical hoses to the down tube 30 when a depleted drum 27 is removed and a full drum replaces it, while ensuring that the chemical hoses for a particular chemical is connected to the corresponding drum containing that chemical.

The coded quick-connect coupling 25 (FIGS. 1 through 4) of the present invention in general includes an extractor head 50 connected to the delivery, feed and indicator hoses 34, 36, and 38; an extractor drum insert 52 connected to the drum 27 and its down tube 30; a latch generally indicated at 54 for securing the extractor head and the extractor drum insert together when they are matched and interfitted; a poppet valve 56 that opens and closes upon connection and disconnection, respectively, of the extractor head and the extractor drum insert; and a key coding system 58 that ensures connection of the extractor head and delivery hose 34 for a certain chemical to the extractor drum insert and supply drum 27 containing that chemical.

Figure 3:
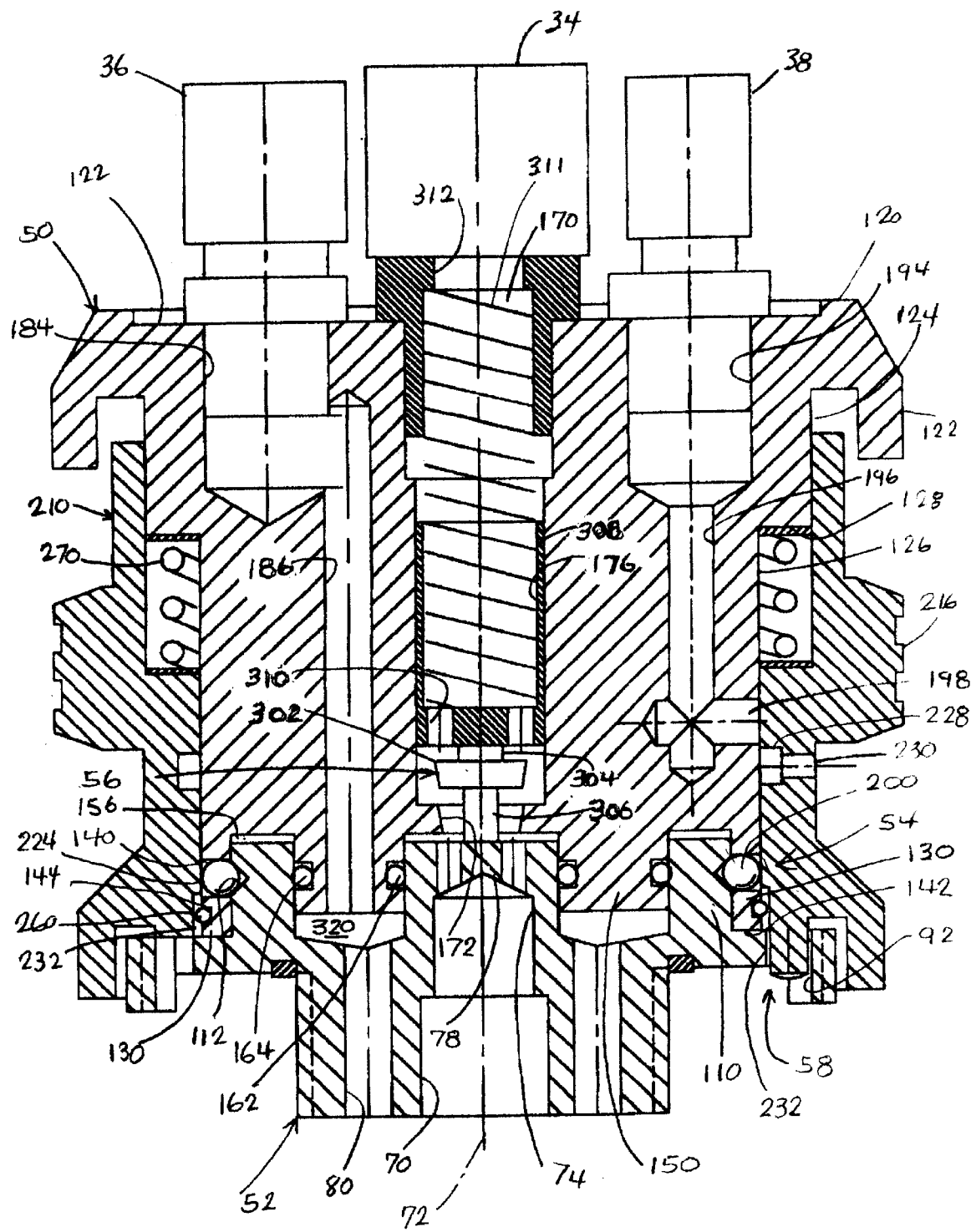
FIG. 3 is a view similar to FIG. 2 but with the coupling members interfitted, matched and latched.
Figure 4A:
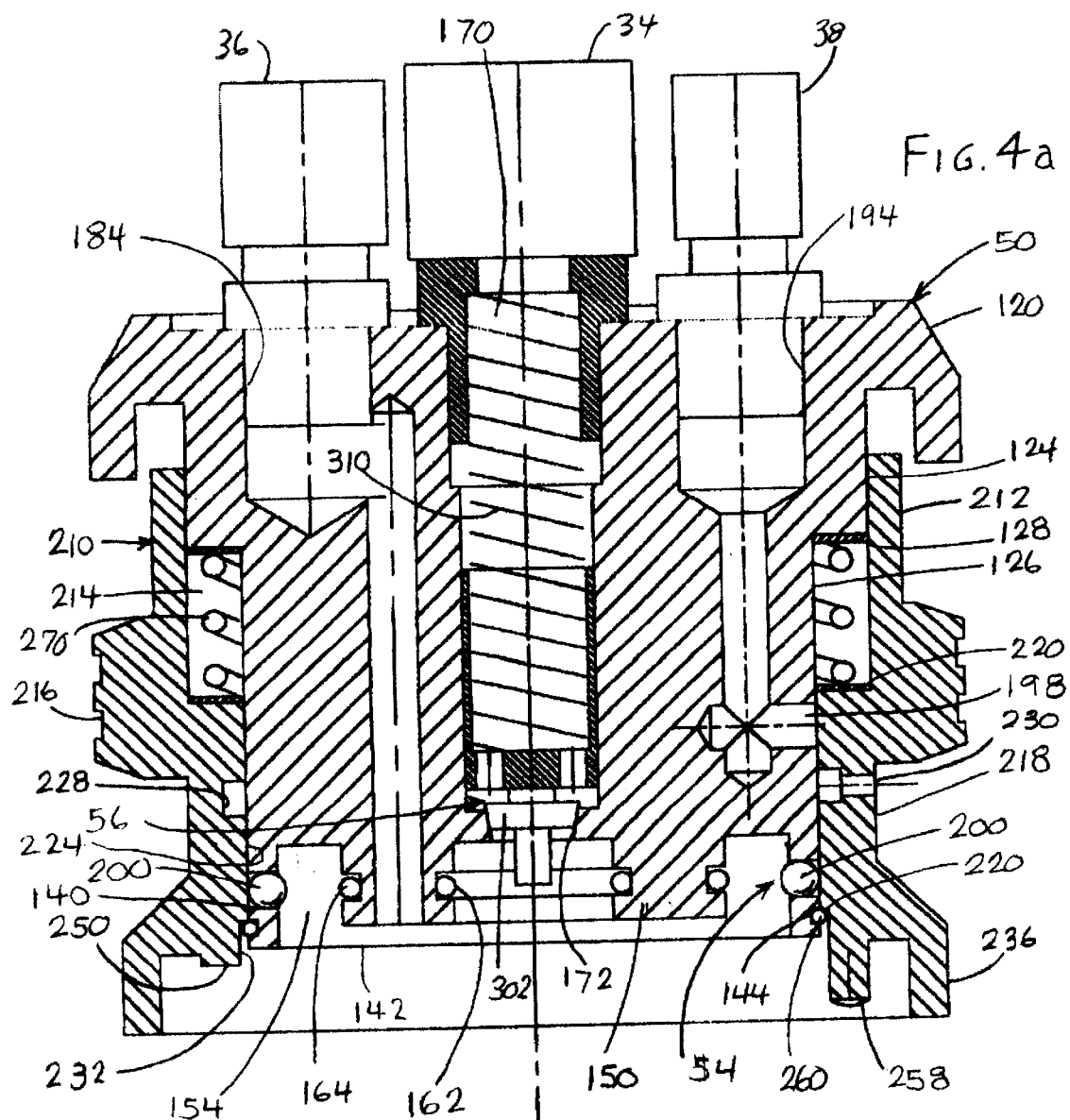
FIGS. 4a and 4b are views similar to FIGS. 2 and 3 but respectively showing the extractor head and sleeve separated and uncoupled from the extractor insert.

The subject coded fluid coupling 25 is best described in detail by reference to FIGS. 2 through 4. The coupling is shown partially assembled in FIG. 2 with the extractor head 50 and the extractor drum insert 52 matched, interfitted and unlatched, that is, unlocked. FIG. 3 shows the coupling fully assembled, matched, interfitted and securely latched or locked. FIGS. 4a, b show the extractor head separated from the extractor insert but in condition to be thrust down on an extractor insert and coupled thereto if a match exists.

In describing the orientation of the extractor head 50 and drum insert 52 (FIGS. 2 through 4), a vertical orientation of the coupling 25 is assumed since this is its normal orientation in use. It will be understood, however, that the coupling is not limited to use in a vertical orientation, although such reference is convenient for descriptive purposes. Furthermore, the coupling is made almost exclusively of a corrosion-resistant, durable, and hard fluoropolymer plastic, such as "Teflon" PFA, that is perfluoroalkoxy, sold by the Dupont Corporation among others, or polyethylene. The only parts of the coupling that are not of this plastic material are the cores of coil springs, as explained below. Most of the parts of the coupling may be either molded or machined, although one of the major advantages of the subject coupling is that it may be readily molded rather than machined since the latter is more expensive.

Figure 5:
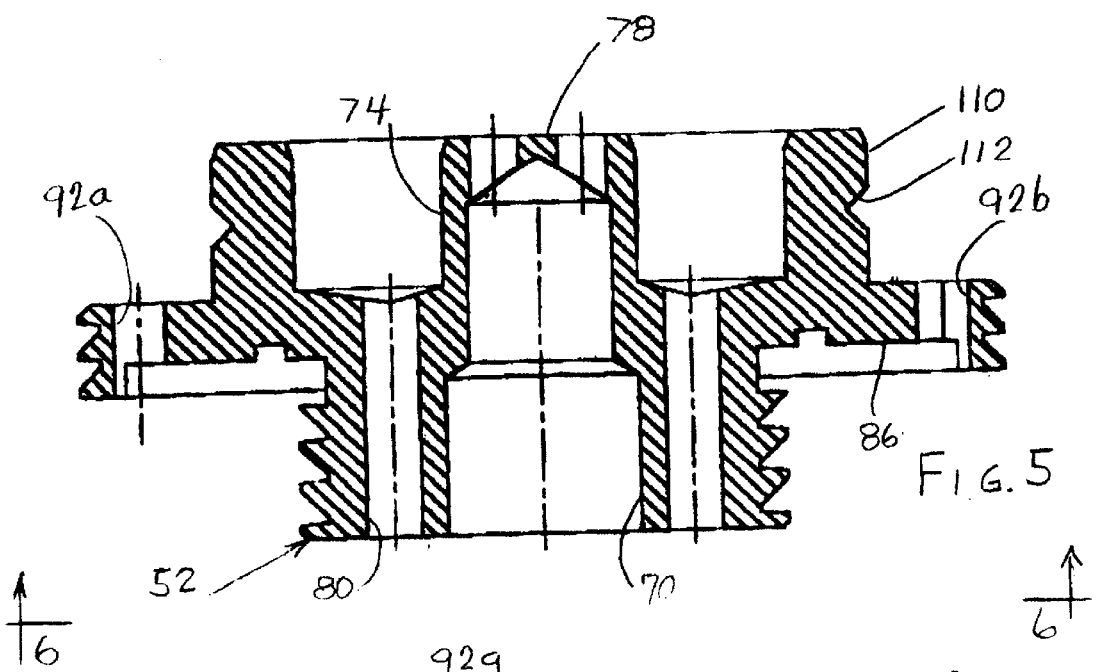
FIG. 5 is a somewhat enlarged, longitudinal section of the extractor drum insert shown in FIG. 4b.

The extractor drum insert 52 (FIGS. 5, 6) includes a lower, cylindrical, adapter fitting 66 having external threads 68 and providing a main or central fluid passageway 70 having a longitudinal central axis 72. The drum insert also includes an upper male coupling member 74, coaxial with the passageway and having a smooth external cylindrical surface 76. A spider 78 is provided at the top of the male coupling member and, as is well known, provides a solid central portion surrounded by a plurality of openings allowing fluid material to flow therethrough and around the central portion. The adapter fitting also has a plurality of longitudinal air passages 80, six in the disclosed embodiment, that are parallel to the central passageway and in substantially equally spaced relation around the central passageway. The main passageway connects to the down tube 30 (FIGS. 1, 2) for extracting the chemical from the drum 27, and the air passages open into the drum above the level of the chemical therein. A gasket 82 seals between the drum and the insert.

The extractor drum insert 52 (FIGS. 5, 6) also has an annular key-coding flange 86 projecting radially outwardly from the adapter fitting 66 and terminating in an annular skirt 88. The skirt has external threads 90 so that the insert is adapted for fitting into a bung hole, as 32, of a different dimension from the adapter fitting 66. The coding flange 86 has a plurality of coding holes 92 that are part of the key-coding system 58 of the present invention which will be subsequently described in more detail. At this point, however, it is to be noted (FIG. 6) that the coding holes include balancing holes 92a and 92b located in diametrically opposite positions on the coding flange and indexing holes 92c, 92d, and 92e located in angularly spaced relation to each other and to the balancing holes 92a and 92b, all of the holes being adjacent to the rim of the coding flange. In the subsequent description when the coding holes are generally referred to, the reference number 92 is used, but when a specific coding hole is referred to, the reference number 92 followed by a letter is used.

The latch 54 (FIG. 2) includes an inner latching ring 110 (FIGS. 5 and 6) projecting upwardly from and integral with the coding flange 86 in radially outwardly spaced, concentric relation to the male coupling member 74 and in radially inwardly spaced relation to the coding holes 92. The inner latching ring has an annular, radially outwardly opening, latching groove 112 that is V-shaped in cross section thereby to provide outwardly, upwardly and downwardly extending, divergent or beveled groove surfaces.

Figure 7:
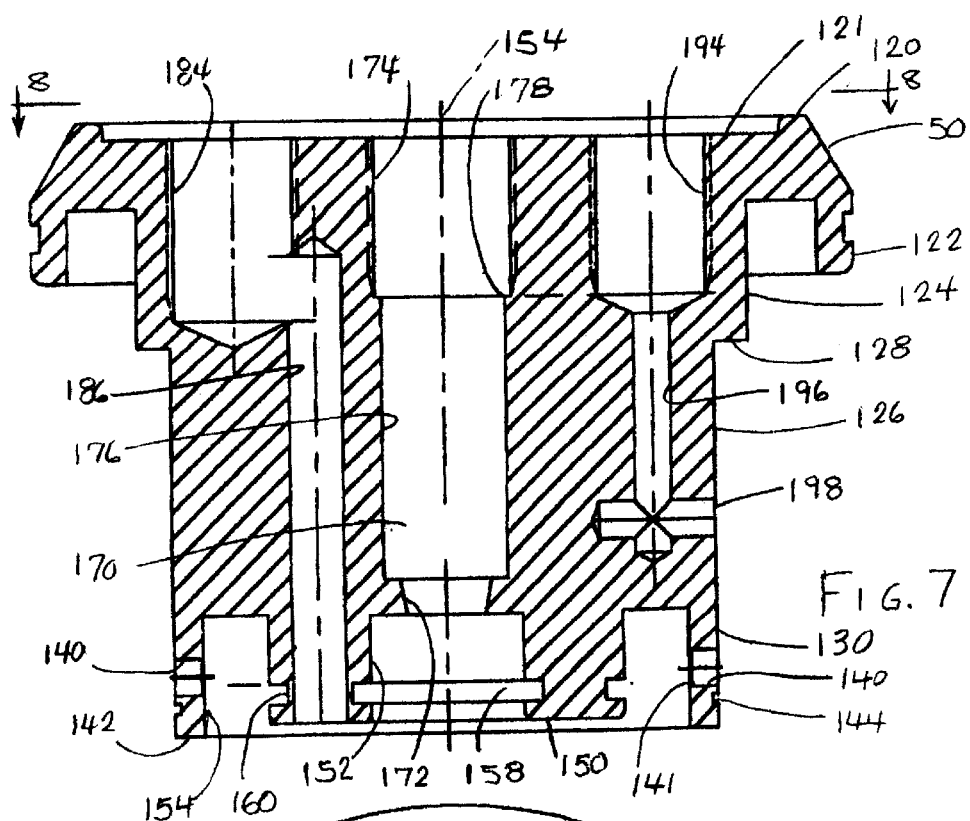
FIG. 7 is a somewhat reduced, longitudinal section of the extractor head shown in FIG. 4a but separated from the sleeve and without the delivery lines and poppet valve.
Figure 8:
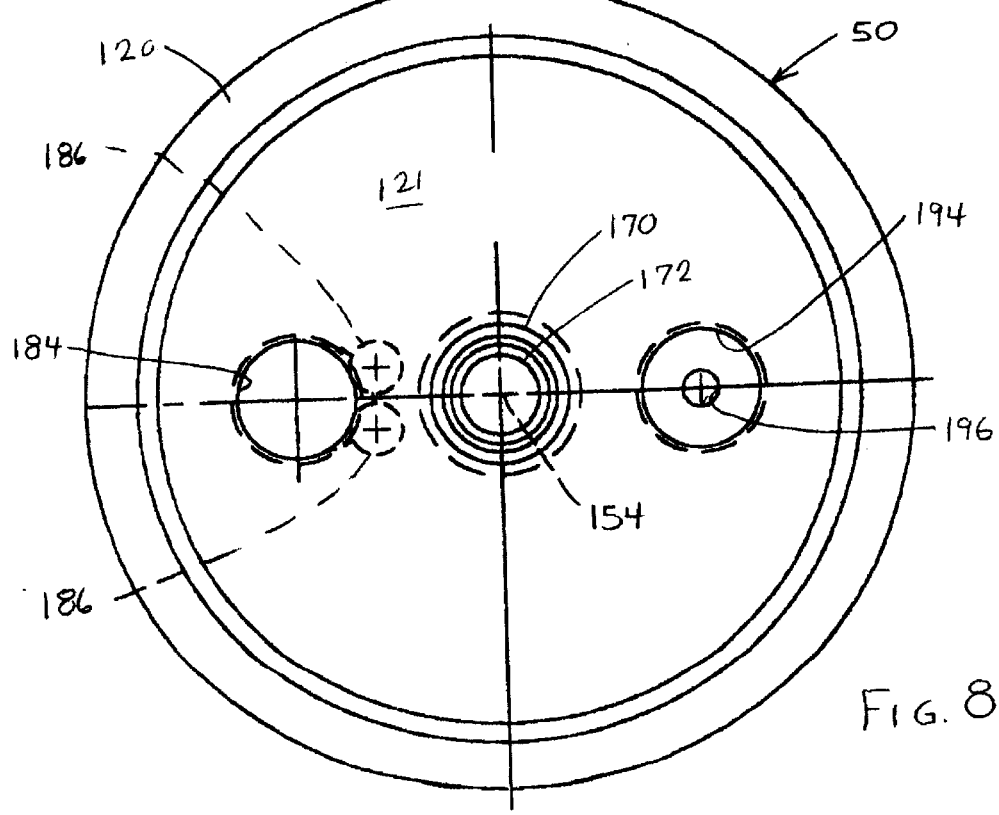
FIG. 8 is a top plan view of the extractor head taken from a position indicated by line 8—8 in FIG. 7.

The extractor head 50 (FIGS. 7, 8) includes a radial upper end wall 120 that has a large central recessed area 121, an upper annular canopy 122 extending downwardly from the upper end wall, a cylindrical upper external surface 124 extending downwardly from the upper end wall and radially inwardly spaced from the canopy, and a cylindrical lower external surface 126 of a reduced diameter from the upper surface and extending downwardly therefrom to provide an upper radial shoulder 128. The extractor head also includes an outer latching ring 130 that is a lower annular extension of the lower external surface but forms part of the latch 54.

The latch 54 (FIGS. 2 through 4a, b and 7) of the present coupling 25 also includes a plurality of latching holes or bores 140, eight in this disclosed first embodiment, that extend radially through the outer latching ring 130 of the extractor head 50. These latching holes are equally angularly spaced about the outer latching ring so that with the eight holes in the disclosed embodiment, the holes are spaced approximately forty-five degrees apart. In addition, these holes have insides chamfers 141 that taper inwardly. That is, each hole has an inside diameter slightly less than its principal or outside diameter. The outer latching ring terminates in a lower radial end face 142, and an annular radially outwardly opening retainer groove 144 is located in the outside face of the outer latching ring between the latching holes and the lower end face.

The extractor head 50 (FIGS. 7, 8) also has a lower female coupling member 150 providing a central, downwardly opening axial socket 152 defining a central longitudinal axis 154 of the extractor head. The female coupling member is equidistantly, radially, inwardly spaced from the outer latching ring 130 so as to define a downwardly opening latching annulus 154 therebetween. The female coupling member has an inner, annular sealing groove 158 facing into the socket and an outer annular sealing groove 160 facing into the latching annulus. An inner O-ring 162 (FIG. 3) is positioned in the inner groove, and an outer O-ring 164 is located in the outer groove. In this regard, it is to be noted that both of these O-rings are located in the extractor head and that no O-rings are located in the extractor drum insert, thereby facilitating molding of the insert.

The extractor head 50 (FIGS. 7, 8) also has a main or central fluid passageway 170 extending coaxially upwardly from and in fluid communication with a valve seat 172 that opens downwardly into the female coupling member 150 and connects to the delivery hose 34. The main passageway opens upwardly in the center of the upper end wall 120 and has an upper threaded section 174, a lower smooth section 176, and a radial shoulder 178 between the upper and lower sections.

Still further, the extractor head 50 (FIGS. 7, 8) provides a threaded air return bore 184 offset from the main passageway 170 for connection to the feed hose 36.ABstand Dual, longitudinally extending air passages 186 extend longitudinally through the extractor head in parallel relation to the main passageway and in offset relation to the air return bore. These air passages have upper ends connected to the air return bore and lower ends opening downwardly from the head through the female coupling member 150. Also, the head has a threaded air indicator or sensor bore 194 on the opposite side of the main passageway from the air return bore. A single air passage 196 extends from the indicator bore longitudinally downwardly and thence radially of the head to an air vent 198 that opens through the lower external surface 126 of the head above the latching holes 140.

The latch 54 of the subject coupling 25 (FIGS. 2 through 4) includes a plurality of spherical, uniformly sized, latching balls 200 each having a diameter greater than the minimum, but less than the maximum, diameter of the latching holes 140. The balls are individually located in the latching holes for movement radially of the extractor head 50 between latching positions wherein portions of their spherical surfaces project into the latching annulus 154 (FIGS. 3 and 4) and retracted positions (FIG. 2) wherein the balls are entirely withdrawn into the latching holes so that none of the peripheries of the balls projects into the latching annulus. As previously mentioned, the latching holes are tapered so as to limit radial inward movement of the balls into the latching annulus. That is, only spherical segments of the balls are allowed to project into the annulus, whereas the balls are free to move outwardly in the latching holes so as to drop out of the extractor head, except that they are retained therein in a manner described below.

A coded latching sleeve 210 (FIGS. 2 through 4, 9, 10) is axially and rotatably, slideably mounted on the extractor head 50. The sleeve includes an upper cylindrical section 212 slideably fitted around the upper cylindrical surface 124 of the head and radially outwardly spaced from the lower cylindrical surface 126 of the head. The sleeve also has a lower cylindrical section 218 slideably received on the lower external surface. A lower radial shoulder 220 between the upper and lower sections is in downwardly spaced, opposed relation to the upper radial shoulder 128, and these shoulders together with the upper cylindrical section 212 and the lower external surface 126 define an annular pocket 214. The sleeve also has an external, knurled actuating ring 216 (see also FIG. 1) projecting radially outwardly from the upper and lower sections 212 and 218 approximately midway between the upper and lower ends of the sleeve. The sleeve is thus axially slideable on the head into and out of unlatched and latched positions and is rotatable on the head into and out of matched and unmatched positions, as will be more fully described below.

The lower cylindrical section 218 of the latching sleeve 210 (FIGS. 2 through 4, 9, 10) has an inside, lower, cylindrical bearing surface 224 that slideably engages the lower cylindrical surface 126 of the extractor head 50 in their assembled condition. An annular venting passage 228 in the sleeve opens inwardly of this bearing surface and is registrable with the air vent 198 in the unlatched position of the sleeve. The sleeve also has a radially extending air vent 230 that communicates with the venting passage and opens outwardly from the sleeve just under the actuating ring 216. Still further, the sleeve has a cylindrical recessed surface 232 of slightly greater diameter than the bearing surface and extending endwardly therefrom. The bearing and recessed surfaces are joined by a radial annular shoulder 234. The sleeve also has a lower outer skirt 236 that projects downwardly from the lower end of the sleeve in radially outwardly spaced relation to the recessed surface.

The key coding system 58 of the subject coupling includes a coding ring 250 (FIGS. 2 through 4, 9, and 10) that is integral with and projects downwardly from the lower cylindrical section 218 of the coded latching sleeve 210. The recessed surface 232 is the inside surface of the ring and is in circumscribing, closely radially spaced relation to the lower external surface 126 of the extractor head 50 when the head and the sleeve are assembled. A plurality of coding pegs 258 project downwardly from the coding ring, with each peg being of a shape and size as to fit into a coding hole 92. Circular pegs and holes are disclosed and preferred but other shapes may be used. The coding pegs include diametrically opposed coding pegs 258a and 258b and angularly spaced coding pegs, as 258c, in equally, angularly spaced relation around the coding ring corresponding to the location of the coding holes and depending on whether a match is made between a particular extractor head 50 and a particular extractor drum insert 52. The nomenclature and reference characters for the pegs correspond to that discussed in the description of the coding holes.

Figure 6:
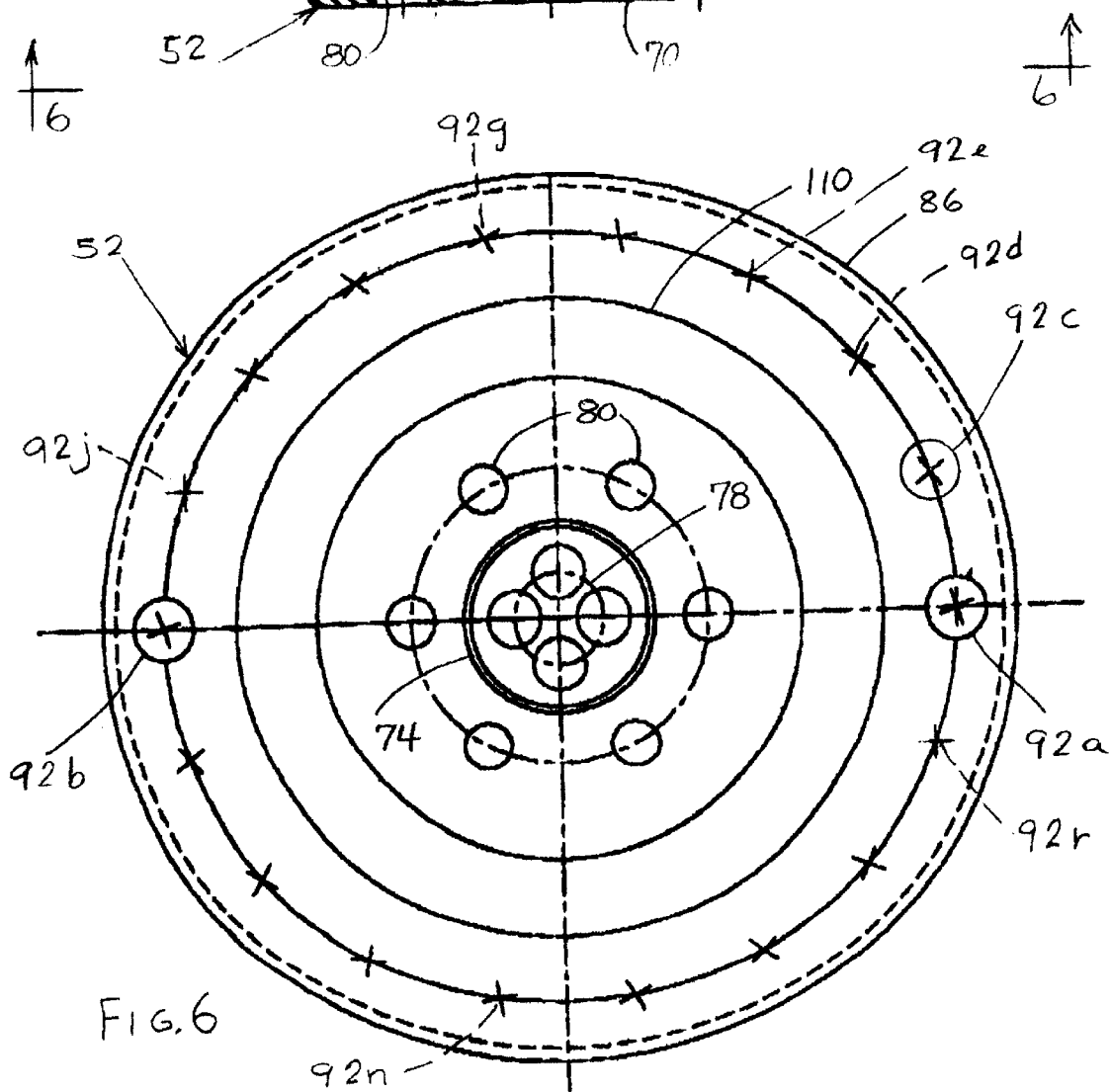
FIG. 6 is a bottom plan view of the extractor drum insert taken from a position indicated by line 6—6 in FIG. 5.

As referred to above, multiple coding combinations are provided by the key-coding system 58 of the subject invention (FIGS. 6 and 10). These combinations are achieved by varying the number, size, shape, and location, i.e., angular spacing, of the coding pegs 258 and the coding holes 92. The disclosed preferred embodiment effects the desired combinations by varying the number and angular spacing of the holes and pegs. Although not used in the preferred embodiment, additional combinations can be achieved by varying the size and/or shape of the pegs and holes. In the preferred embodiment, the coding system uses circular pegs and circular holes of the same diameter, i.e., so that the pegs are capable of fitting in the holes when they are aligned and there is a complete match. The preferred coding system further involves using diametrically opposite balancing pegs 258a and 258b and corresponding diametrically opposite balancing holes 92a and 92b plus from one to sixteen more indexing pegs 258c through 258r and indexing holes 92c through 92r, with adjacent pegs and adjacent holes being separated by twenty degrees. In this preferred system, sixteen different chemicals are accommodated by the described coding. For simplicity, only one indexing peg 258c and one indexing hole 92c are shown, but it will be understood that, depending on the particular code, there may be pegs and holes at each twenty-degree interval. A few other pegs and holes are indicated by dashed lines and reference characters pointing to cross-hatches where the pegs and holes are located.

For example, (FIGS. 6 and 9) key code 1 involves the two balancing pegs 258a,b and holes 92a,b and just one indexing peg 258c and indexing hole 92c spaced twenty degrees counterclockwise from the peg 258a and the hole 92a; key code 2 involves the two balancing pegs 258a,b and holes 92a,b and two indexing pegs 258c,d and indexing holes 92c,d spaced twenty degrees and forty degrees counterclockwise from the peg 258a and the hole 92a; key code 3 involves the two balancing pegs and holes and three indexing pegs 258c,d,e and holes 92c,d,e spaced twenty, forty, and sixty degrees counterclockwise from the peg 258a and the hole 92a; and so forth up to key code 16 using all eighteen pegs and holes. Although the key-coding examples as described above provide sixteen different combinations, it will be understood that many other combinations can be provided by varying the number, size, shape, and location of the coding pegs and the coding holes, as previously explained.

Figure 11:
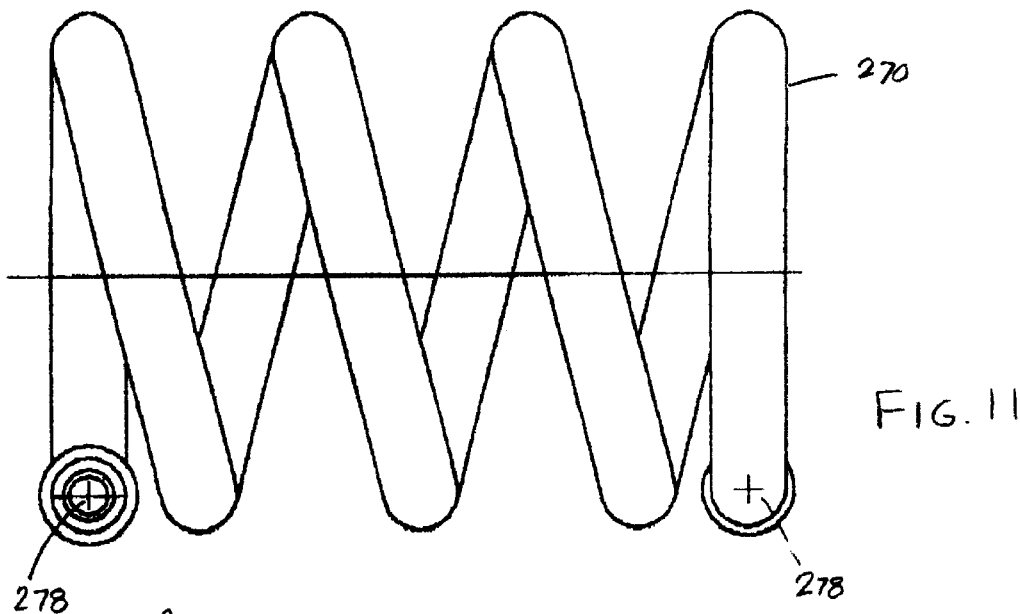

After the extractor head 50 and latching sleeve 210 are assembled, and the sleeve is pulled up on the head (FIGS. 2 and 3), a retaining ring 260 is fitted in the retainer groove 144 of the extractor head and projects radially outwardly from the retainer groove in opposed relation to the recessed surface 232 of the latching sleeve and provides an outside diameter that exceeds the inside diameter of the bearing surface 224. The retaining ring has an endless metal core, preferably made of spring steel, and an external plastic coating, preferably made of Teflon or polyethylene, similar to the construction shown in FIGS. 11 and 12. Thus, the ring is extremely durable and tough, but it does have a measure of diametric elasticity. In other words, in its normally relaxed condition, the internal diameter of this retainer ring is approximately equal to the diameter of the retainer groove. For assembly of the retainer ring on the extractor head, the diametric elasticity of the ring allows it to expand just enough to increase its diameter to a size greater than the outside diameter of the lower cylindrical surface 126, that is, the outer latching ring 130. The retainer ring is thus expanded to slip over the lower end of the extractor head and then allowed to contract into the groove where it fits with its peripheral portion extending slightly outwardly from the lower cylindrical surface of the head, as seen in FIGS. 2 through 4a.

A coiled actuator spring 270 (FIGS. 2–4, 11, 12) circumscribes the lower cylindrical surface 126 of the extractor head 150 and is positioned in the annular pocket 214 between the upper and lower radial shoulders 128 and 220 so as yieldingly to urge the latching sleeve 210 downwardly on the head 50 toward its latching position. The spring is compressible, however, to allow the sleeve to be moved upwardly on the head in a manner to be described more fully when discussing the operation of the subject coupling 25. This spring also includes an internal metal core 272 (FIGS. 11, 12) preferably of spring steel and an external plastic cover 274 surrounding the metal core and having opposite open ends 276. Plastic balls 278 are frictionally fitted in fluid-tight relation to the cover in the open ends thereof so as to isolate the metal core and preclude the entry of fluids into the cover into contact with the core. The cover and the balls are preferably made of Teflon or polyethylene.

The poppet valve 56 (FIGS. 2 through 4) includes a frusto-conical valve head 302 and upper and lower valve stems 304 and 306 extending respectively upwardly and downwardly from the valve head coaxially of the main passageway 170. The valve also includes a tubular extension 308 connected to the upper valve stem and axially slideably fitted in the lower smooth section 176 of the main passageway. This tubular extension has a lower end wall with openings 310 providing communication therethrough. A valve spring 311 is positioned in the tubular extension and bears against a spring retainer 312 secured within the main passageway above the tubular extension for resiliently urging the valve head 302 into the valve seat 172. The spring 311 is constructed like the actuator spring with an internal metal core and a plastic cover.

OPERATION AND METHOD OF USE

Figure 4B:
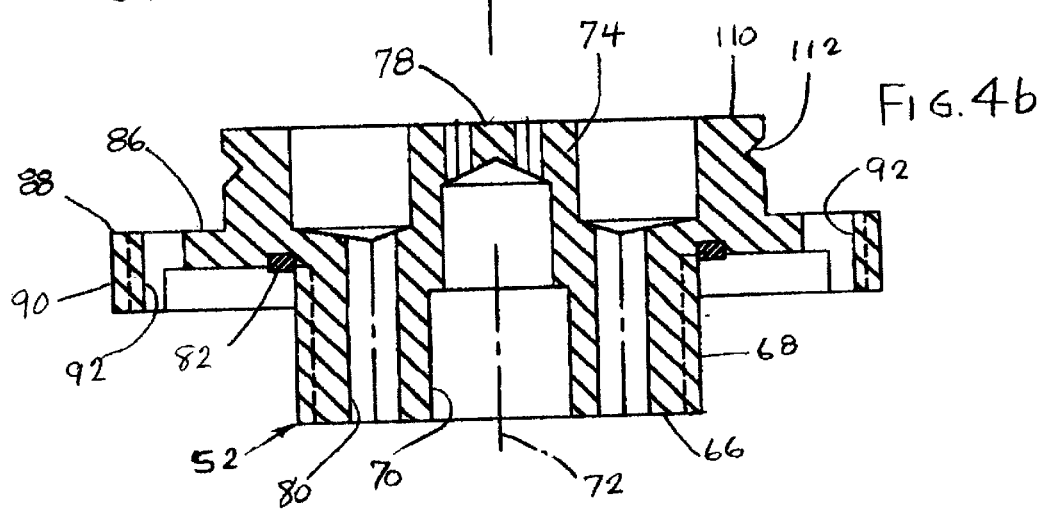

Before describing the operation and method of use of the subject coupling 25, brief reference is made to the chemical extraction apparatus or system (FIG. 1) in which this coupling is especially suited for use. Thus, the down tube 30 is connected to the main passageway 70 of the extractor drum insert 52, and the insert is threaded into the bung hole 32 of a fifty-five gallon drum 27 containing a chemical to be extracted. As such, the male coupling member 74 and the latching ring 110 extend upwardly from the drum, it being assumed at this point in the operation of the coupling that the extractor head 50 is not connected to the extractor drum insert (FIGS. 4a and 4b). As part of the chemical extraction system, the extractor head is, however, connected to the chemical delivery and feed hoses 34 and 36 with the delivery hose 34 connected to the main passageway 170 and the feed hose connected to the air return bore 184. Also, as part of the subject invention, the air indicator hose 38 is connected to the air indicator bore 194. Also, at this time, the poppet valve 56 is closed with the valve head 302 in sealing engagement in the valve seat 172, being urged there by the valve spring 310.

Also, at this initial stage, with extractor head 50 and drum insert 52 separated, the actuating spring 270 urges the coded latching sleeve 210 into its fully extended position on the extractor head 50, as shown in FIG. 4a. Several relationships between the sleeve and the head are to be noted in this position of the sleeve. First, the upper section 212 of the sleeve is spaced below the upper end wall 120 of the extractor head so as to permit subsequent upward travel of the sleeve on the head. Secondly, the venting passage 228 in the sleeve is not in registration with the inner air vent 198. Next, the lower radial shoulder 220 of the sleeve is forced against the retaining ring 260 by the actuating spring 270. In other words, the retaining ring prevents the sleeve from being pushed off the head by the actuating spring. It is thus understood why the retaining ring must have the durability and strength as described above since it must withstand the pressure of the spring 270 and preclude release of the sleeve; furthermore, repeated abutment of the shoulder 220 with the ring subjects the ring to considerable wear and tear. Also at this initial stage, the lower bearing surface 224 of the sleeve precludes outward movement of the latching balls 200 and thus captures them in the latching holes 140. It will be recalled that the balls cannot fall from the holes inwardly of the sleeve because the inner diameters of the holes do not permit the balls to move therethrough. In addition, at this stage, the coding ring 250 and the coding pegs 258 project downwardly below the lower end face 142 of the extractor head.

It is now assumed that the extractor head 50 (FIGS. 1 and 2 through 4a, b) is to be connected to the extractor drum insert 52. More broadly, in the context of the chemical extraction system, it is assumed that a delivery hose 54 for a particular chemical is to be connected to a drum 27 containing that chemical. It is further first assumed that the extractor head and the extractor drum insert to be connected are matching, thereby indicating that the particular chemical intended to be delivered in the hose 34 is in fact the chemical in the drum 27. The key coding system 58 of the present invention thus will provide matching coding holes 92 and coding pegs 258. If the key code illustrated in FIGS. 6 and 10 is being used (designated herein as Code 1), there are three coding holes and three coding pegs in matching locations respectively on the key coding flange 86 and the coding ring 250. In other words, the code being used includes diametrically opposed balancing holes 92a and 92b, diametrically opposed balancing pegs 258a and 258b, one indexing hole 92c spaced twenty degrees counterclockwise from the balancing hole 92a, as viewed looking up at the coding flange (FIG. 6), and one indexing peg 258c spaced twenty-degrees counterclockwise from the balancing peg 258a, also as viewed looking upwardly at the coding ring (FIG. 10).

The extractor head 50 and coded latching sleeve 210, as may be visualized in FIG. 1 and FIGS. 4a, and 4b are manually grasped in the two hands of an operator and brought down over the extractor drum insert 52. Preferably, the thumbs of the operator's hands bear downwardly on the upper end wall 120 of the extractor head and the other fingers are placed under the actuating ring 216 of the sleeve. When the male and female coupling members 74 and 150 are in adjacent axial alignment, the sleeve and the head are squeezed together to lift the sleeve relative to the head, from the FIG. 4a, b position to the FIG. 2 position. While so moved and held, the air port 230 and the air vent 198 are brought into registration so that air escapes from the air port and can be heard or even felt by an operator's hands on the ring 216. Also at this time, the recessed surface 252 of the sleeve is opposite to the latching holes 140, thereby freeing the latching balls 200 so they can move outwardly in their respective holes.

While squeezing the extractor head 50 and latching sleeve 210 together (FIG. 2), the extractor head (FIG. 2) is pushed down onto the extractor drum insert 52 so that the female coupling member 150 fits over the male coupling member 74 and the latching annulus 154 fits over and receives the latching ring 110. With the sleeve pulled upwardly in this fully retracted position, the latching balls 200 are allowed to move outwardly and allow the latching annulus to move down over the latching ring into fully interfitted relationship. Whether or not the coding pegs 258 are exactly aligned with the coding holes 92 when the head is brought down onto the insert in this manner, the latching ring fully seats within the latching annulus.

Figure 2:
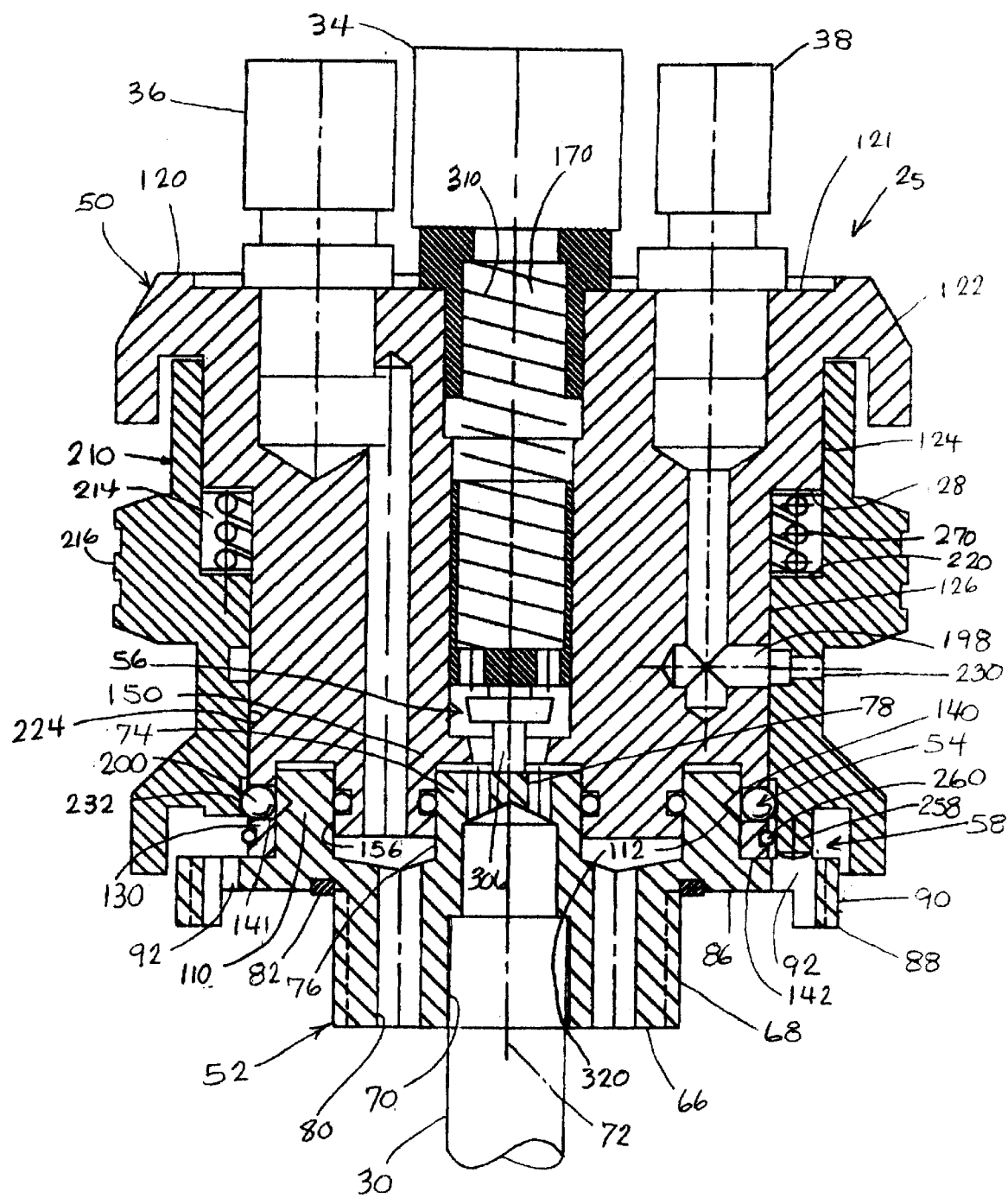
FIG. 2 is an enlarged, longitudinal section of the preferred embodiment of the coded coupling shown in FIG. 1, such coupling including an extractor head providing one of the coupling members, a coded extractor drum insert providing the other coupling member, and a coded latching sleeve, the coupling members being shown in interfitted relationship but unlatched.

While still squeezing the latching sleeve 210 and extractor 50 (FIG. 2), the operator allows the sleeve to move axially toward the extractor insert 52 whereby the coding pegs 258 engage the coding flange 86, a position not shown, but easily visualized from FIG. 2. At this time, it is possible, but not probable, that the coding pegs will be exactly aligned with the coding holes 92 and slip right into them. More likely, the operator will need to rotate the sleeve relative to the extractor head 50 and the extractor drum insert 52, causing the coding pegs to slide circumferentially on the coding flange. Since the insert is secured to the drum 27, the sleeve rotates easily relative to the insert. Since the extractor head is connected to the hoses 34, 36, and 38, it is maintained relatively stationary so that the sleeve can rotate relative to the extractor head. Such rotation occurs until the coding pegs 258 are exactly aligned with their corresponding coding holes 92, assuming of course that the pegs and holes are matching as was earlier assumed in this example. At this time, the sleeve is forced downwardly by the actuator spring 270, and the pegs are thrust into the holes (FIG. 3). Also, the bearing surface 224 moves downwardly over the latching holes 140, pushing the latching balls 200 inwardly and their inner peripheries into the latching groove 112. Moreover, as long as the expansive force of the actuating spring 270 remains on the sleeve, the bearing surface maintains the balls in the groove, whereupon the extractor head 50 and the drum insert 52 are maintained latched in coupled relationship, until manually released.

Also, when the latching ring 110 (FIGS. 2 and 3) fully seats in the latching annulus 154, lower valve stem 306 engages the spider 78 and lifts the valve head 302 off the valve seat 172. Opening the valve 56 establishes fluid communication from the down tube 30 (FIG. 1), through the male and female coupling members 74 and 150, through the valve seat, into the main passageway 170 of the extractor head 50, and eventually into the delivery hose 34. At the same time, nitrogen or air is supplied from the feed hose 36 into the air return bore 184, through the dual air passages 186 and into the manifold 320 that is formed between the extractor head and the extractor drum insert 52 in circumscribing relation to the male coupling member. From the manifold, air travels through the air passages 80 into the drum to replace the chemical withdrawn through the delivery hose and to prevent the formation of a vacuum. The O-rings 162 and 164 seal between the coupling members and prevent the escape of chemical or air.

Of prime significance, coupling of the extractor head 50 and the drum insert 52 is achieved without twisting or swiveling the head or the hoses 34, 36, 38 connected to it, although swiveling is accommodated if the natural position of the hoses forces an untwisting action. Only the latching sleeve 210 need rotate, but here, no time-consuming threading or unthreading is required. It is also significant that when the sleeve is released by the operator allowing interfitting of the coding pegs 258 and the coding holes 92 (FIG. 3), the air port 230 moves out of registration with the air vent 198 thereby to cut off the outflowing stream of air and indicating to the operator that, in fact, a matched interfitted relationship has been established between the extractor head 50 and the extractor drum insert 52. Until the pegs drop into the holes, however, the port and vent remain aligned and air continues to escape, telling the operator that a match has not occurred.

If there is a mismatch between the extractor head 50 and the extractor drum insert 52, and thus between the delivery hose 34 and drum 27, the coding pegs 258 will not match the coding holes 92. Therefore, rotation of the coded latching sleeve 210 will not result in an alignment of pegs and holes, and interconnection will be impossible. It is significant that the sleeve need be turned a maximum of only about three-hundred sixty degrees, and usually less, to test for a match, thus taking only a few seconds, whereupon if there is no match, the head and sleeve can be immediately lifted off the drum insert to close the poppet valve 56.

When it is desired to uncouple the extractor head 50 from the extractor drum insert 52 (FIGS. 2–4a, 4b), the operator grasps the extractor head and the actuator ring 216 of the latching sleeve 210 with both hands, in the same manner as above described to connect the coupling 25, thereby to squeeze the ring and the canopy 122 together against the urging of the actuator spring 270. This squeezing action causes the recessed surface 252 (FIG. 2) to move into opposition with the latching balls 200 (FIG. 3) so that the balls are freed to move outwardly into their retracted positions. While continuing to squeeze the head and sleeve, the operator then lifts the head and sleeve thereby causing the upper bevel on the latching groove 112 to force the balls into their retracted positions. Such upward movement also lifts the lower valve stem 306 off the spider 78 allowing the valve spring 310 to close the poppet valve 56 and shut off the flow of chemical through the central passageways 70 and 170. Any chemical that drips from the extractor head will fall through the spider or into the manifold 320 and drain into the drum 27 (FIG. 1). After the extractor head is free of the extractor insert (FIGS. 4a, 4b), the operator releases his grasp on the head and sleeve thereby allowing the actuator spring to move the sleeve relative to the head into the fully extended position of the sleeve with the shoulder 220 bearing against the retainer ring 260 (FIG. 4). It is again emphasized that no threading and not even any rotation of parts is required to uncouple the coupling 25.

From the foregoing it will be understood that an improved fluid coupling 25 is disclosed having particular application in a chemical extraction system involving drums 27 of chemicals and delivery lines 34 suspended above the drums (FIG. 1). The subject coupling offers many advantages including improvement in the productivity and safety of dispensing a plurality of incompatible chemicals through different delivery lines from different drums in a manufacturing process; the dependable, yet quick connection and disconnection of only matched coupling members; and reduced manufacturing costs because of the ability to mold rather than machine the parts, although machining is possible.

A significant feature of the coupling 25 is that the parts are connected and disconnected without any threading or unthreading of the parts and without twisting of the lines or relative rotation of the coupling members and without regard to the relative rotational positions of the coupling members prior to or during interfitting thereof. In this regard, although the coupling does not require swiveling of its coupling members for connection or disconnection, such swiveling of the parts may occur and is accommodated during connection or disconnection without affecting the operation of the coupling.

The subject coupling 25 minimizes the time required dependably to connect and disconnect matched coupling members of a coded coupling or to determine that the coupling members are mismatched and will not couple; enables many different matching combinations; is balanced for dependable two-handed operation by a user; and allows an operator to confirm whether the coupling members are matched and interfitted or whether they are mismatched and not intermitted.

SECOND EMBODIMENT

A second embodiment of the subject coupling is shown in FIGS. 13 through 17 and is identified by the numeral 425. In general, the coupling 425 differs from the coupling 25 in that the coupling 425 is not coded and thus is used where coding is unnecessary. The coupling 425 is similar to the coupling 25, however, in the way in which the coupling 425 latches. The coupling 425 is preferably molded entirely of Teflon or polyethylene and, as shown assembled in FIG. 13), includes an extractor head 430, an extractor drum insert 52 identical to that used with the first embodiment, and a latch generally indicated at 432, including a latching sleeve 434. Like the coupling 25, the coupling 425 may be used in any orientation, but vertical is the most common and is thus a vertical orientation is used for descriptive convenience.

The extractor head 430 (shown separately in FIGS. 14 and 15) includes an upper adapter fitting 440 providing an outer, externally threaded cylindrical section 442 and an inner spider 444 defining an upper socket 446 therebetween, and a lower female coupling member 448 providing a lower socket 450. The adapter fitting thus accommodates connection to a standard dispensing head, not shown, which in turn is connected to an umbilical dispensing hose. Suitable inner and outer O-rings 452, 454, and 456 (FIG. 13) seal between the dispensing head and the adapter fitting. The adapter fitting has a main fluid passageway 458 and an air return passage 459.

The adapter fitting 440 (FIGS. 14 and 15) has an external cylindrical smooth surface 460 below external threads 462. An annular wall 464 extends radially outwardly from the surface 460, and an annular outer latching ring 466, which is part of the latch 432, extends axially downwardly from the wall, terminating in a radial end face 468. For a purpose to be described, a stop lug 470 extends upwardly from the annular wall 464 adjacent to the rim of the wall.

The outer latching ring 466 (FIGS. 14 and 15) is radially outwardly spaced from the female coupling member 448 thereby to define an annular downwardly opening latching annulus 474 therebetween. The ring has a plurality of latching holes 476 drilled therein in equally angularly spaced relation to each other circumferentially of the skirt. These holes are like the latching holes 140 of the first embodiment, but in this second embodiment, only four holes are provided spaced ninety degrees apart. As with the first embodiment, however, the invention is not limited to any particular number of holes, although eight are preferred in the first embodiment and four are preferred in this second embodiment.

Figure 14:
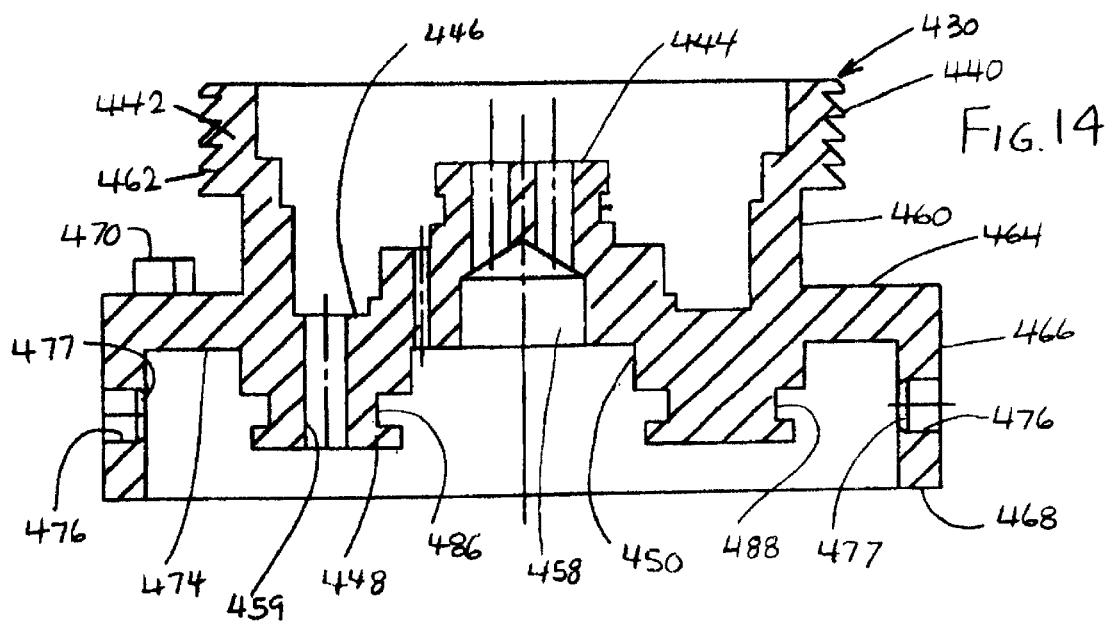
FIG. 14 is a somewhat enlarged longitudinal section of only the extractor head of the coupling shown in FIG. 13.
Figure 15:
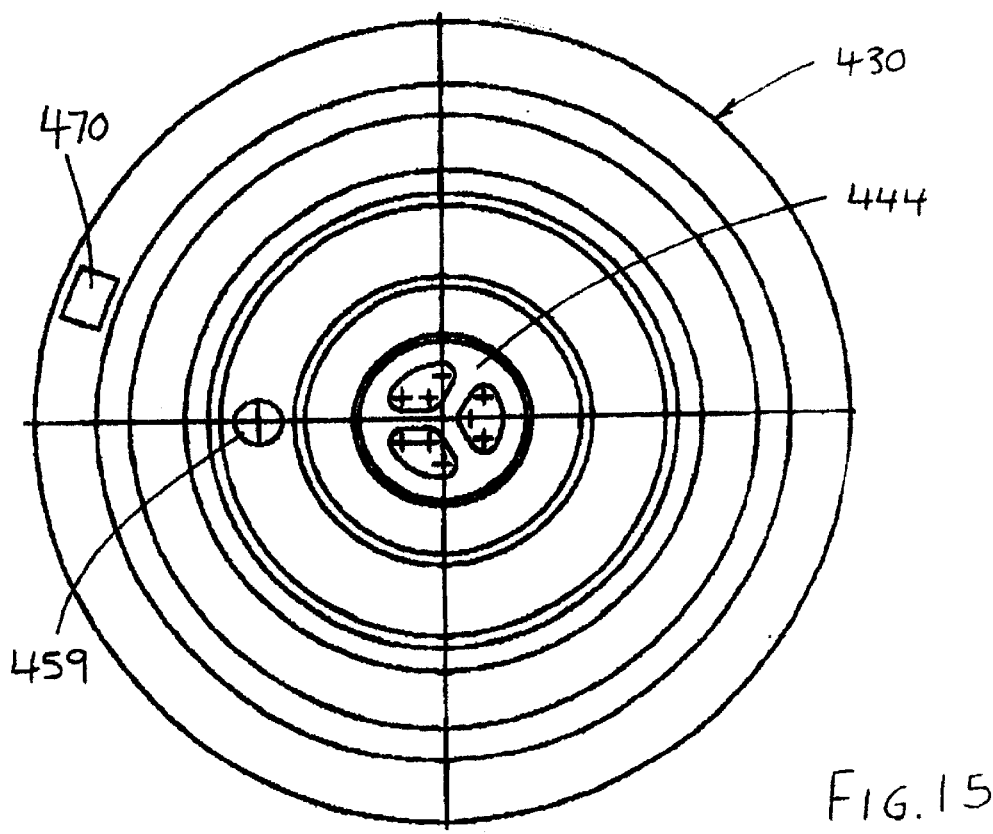
FIG. 15 is a top plan view of the extractor head shown in FIG. 14.
Figure 16:
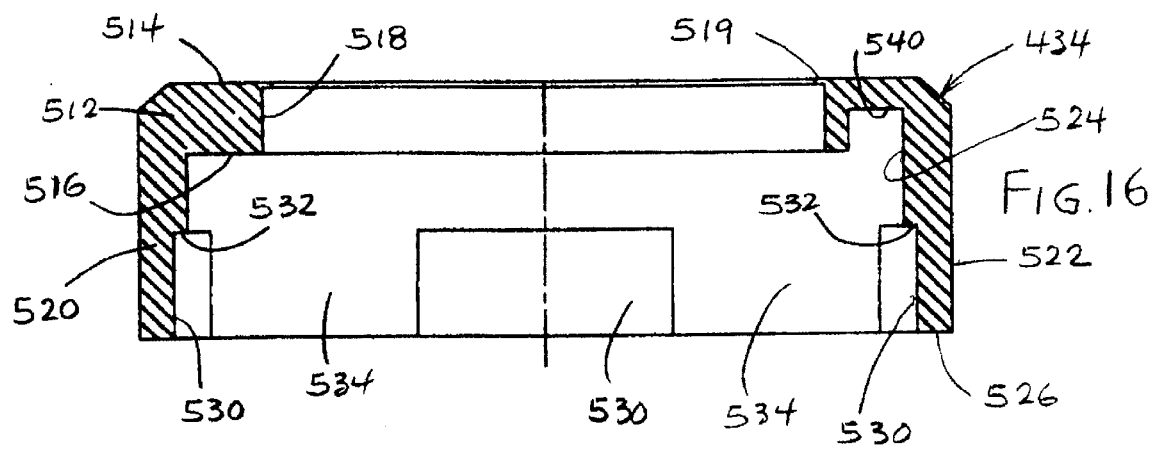
FIG. 16 is a somewhat enlarged longitudinal section of only the sleeve of the coupling shown in FIG. 13.

Like the latching holes 140, the latching holes 476 FIGS. 14 and 15) having inner frusto-conical chamfers that taper radially inwardly of the outer latching ring 466 whereby the 432 also includes spherical latching balls 480 (FIG. 13) of uniform diameter like the balls individually placed in the latching holes, with each ball having a diameter greater than the inner or minimum diameter of the latching holes but less than the principal or outer diameter, i.e., maximum diameter, of the holes. Each ball is thus movable between a latching position (FIG. 13) wherein a segment of its periphery projects into the latching annulus 474 and a retracted position (not shown, but similar to FIGS. 2 and 4a) wherein the peripheral segment is withdrawn into its hole. The female coupling member 448 (FIG. 14) has annular inside and outside sealing grooves 486 and 488 respectively facing into the socket 450 and the latching annulus 474. The inside groove receives an inside O-ring 490 and the outside groove receives an outside O-ring 492.

The latching sleeve 434 (shown assembled in FIG. 13 but separately in FIGS. 16 and 17) which is part of the latch 432, has an upper annular radial shoulder 512 that provides a top outside surface 514, an inside underneath surface 516, and a cylindrical neck 518. An annular resiliently flexible lip 519 extends radially inwardly from the neck. A cylindrical skirt 520 depends from the shoulder and has an eternal knurled surface 522, an annular internal surface 524, and a radial end wall 526. The internal surface (FIGS. 16 and 17) of the skirt has a plurality of arcuate latch recesses 530, equal in number and spacing to the latching holes 476. Each latch recess preferably subtends an arc of about forty degrees, although this angle is not critical as will be subsequently understood. Each of these recesses extends axially of the skirt from an upper shoulder 532 to the end wall 526.

Figure 17:
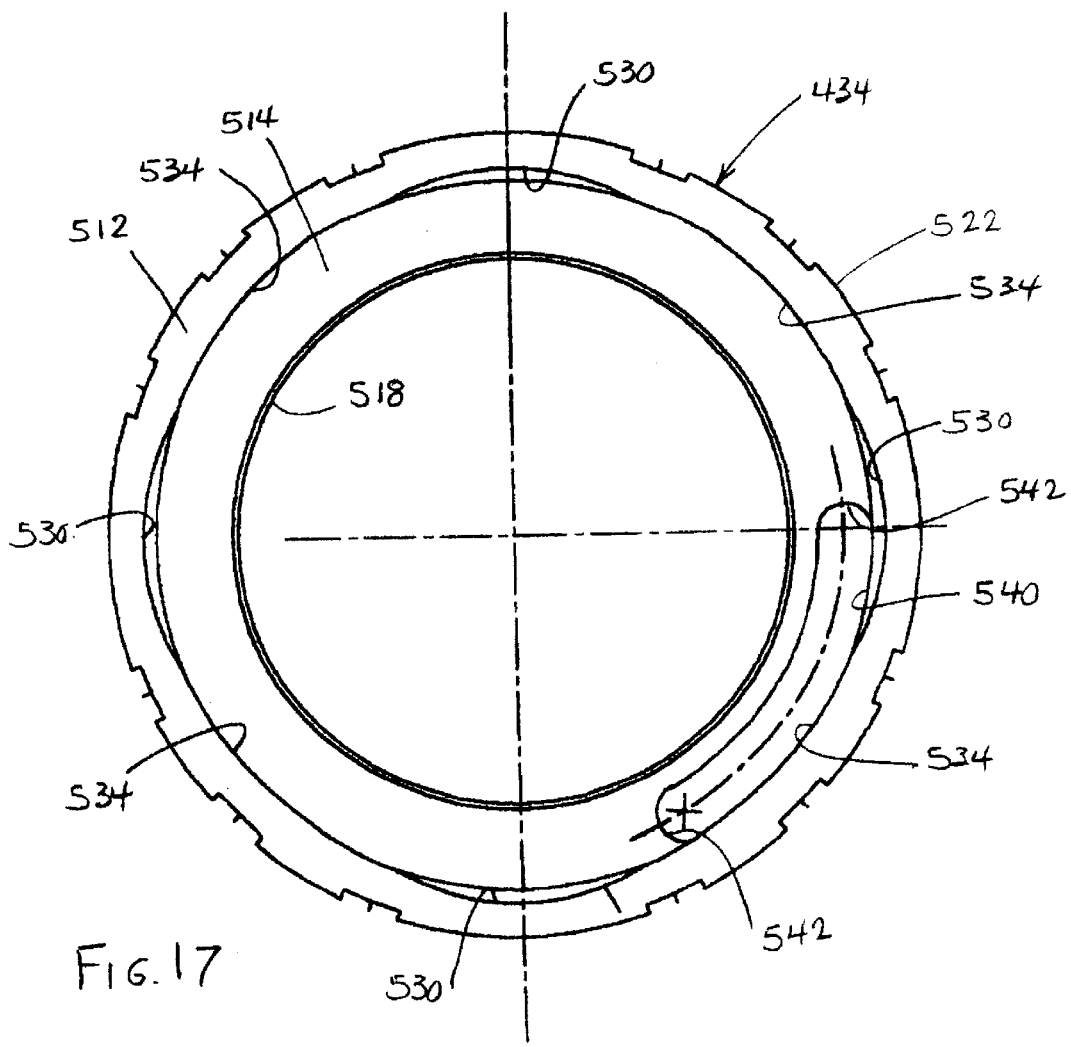
FIG. 17 is a bottom plan view of the sleeve shown in FIG. 16.

The latch recesses 530 (FIGS. 16 and 17) are thus separated by a plurality of arcuate bearing surfaces 534 that are portions of the internal annular surface 524 of the skirt 520. As a result and as best seen in FIG. 17, the inside radius of the skirt at each latch recess 530 is greater than the inside radius of the skirt at the bearing surfaces. Each recess has a radial depth that varies from zero at its ends to a maximum at its center, such maximum depth being less than the diameter of each latching ball 480 but greater than the effective depth of the latching grove 112 in the outer latching ring 110, that is, the distance that the projecting segment of each ball 480 extends out of each hole 476 into the latching groove 112.

The underneath surface 516 (FIGS. 16 and 17) of the upper shoulder 512 of the latching sleeve 434 has a downwardly opening arcuate limit slot 540 therein. In the disclosed second embodiment, this slot subtends and arc of about sixty degrees circumferentially of the shoulder between its ends 542. As will be seen in FIG. 17, this slot extends from about the midpoint of one latch recess about to the adjacent end of the adjacent latch recess.

In order to assemble the latching sleeve 434 and the extractor head 430 (FIG. 13), the latching balls 480 are placed in their latching holes 476, and the skirt 520 is fitted down over the extractor head with the stop lug 470 aligned with the limit slot 540. In so doing, the outer cylindrical section 442 fits through the neck 518, the lip 519 resiliently yielding to allow the section 442 to pass through; actually, the lip yields and slips from one thread to the next as it snaps down below the externally threaded section 442 into the position shown in FIG. 13. It is to be noted that whereas FIG. 13 shows the assembled sleeve and head coupled to the extractor insert, what is being described at this point is only the assembly of the sleeve and head; it is In this assembled condition of the latching sleeve 434 and the extractor head 430 (FIG. 13) several relationships are to be noted: the stop lug 470 is received in the limit slot 540, the latching holes 476 and their latching balls 480 are either opposite the latch recesses 530 or the bearing surfaces 534, depending on the relative angular positions of the sleeve and head; the end wall 526 of the sleeve is in the same plane as the end face 468 of the inner latching ring 110; and the lip 519 is in adjacent axially downwardly spaced relation to the outer section 442 of the adapter fitting 440. assumed that the coupled state of the members 448 and 74 has not yet occurred.

In order to retain this assembled condition (FIG. 13) of the sleeve 434 and the head 430, a flat, resiliently diametrically expandable, radially split, lock washer 550 is spread apart, fitted over the outer section 442, rested on the radial wall 464, and allowed to contract around the cylindrical surface 460 between the outer section 442 and the lip 519 and the shoulder 512. By rotating the sleeve relative to the head through an angle of about sixty degrees, i.e., the length the limit slot 540, or about $\frac{1}{6}^{th}$ of a turn, the sleeve is moved between latching and unlatching positions. In its latching position, the bearing surfaces 534 are opposite to the latching holes 476, engage the latching balls 480, and force them inwardly of their holes into their latching positions, as shown in FIG. 13. In its unlatching position, the latch recesses are opposite to the latching holes and allow the balls to move outwardly into the recesses and thus into their unlatching positions, a position not shown in the drawings but similar to FIG. 2 and believed to be understood.

When it is desired to connect the extractor head 430 to the drum insert 52 (FIG. 13), the latching sleeve 434 is first turned on the head into its unlatched position. It is, of course, understood that the extractor head is connected to a dispensing head and hoses not shown. The assembled head and latching sleeve are then brought down over the insert (visualized in FIG. 13), and the inner latching ring 110 is fitted in the latching annulus 474 with the lower socket 450 of the female coupling member placed down over the male coupling member 74. The inside diameter of the inside O-ring 490 is slightly less than the outside diameter of the male coupling member so that the parts must be pressed tightly together to snap and seat the male coupling member into the female coupling member and the inner latching ring into the latching annulus. When thus assembled, an annular manifold 560 is defined between the extractor head and the drum insert circumscribing male coupling member so as to provide communication from the air return bore 459 to the air passages 80. Communication is also established between the passageways 70 and 458. It is to be noted that the extractor head and drum insert can be interfitted irrespective of their relative rotational positions so that no rotation of the head is required to couple it to the insert, although swiveling of the head is accommodated if forces on the head require it.

Figures 12, 13:
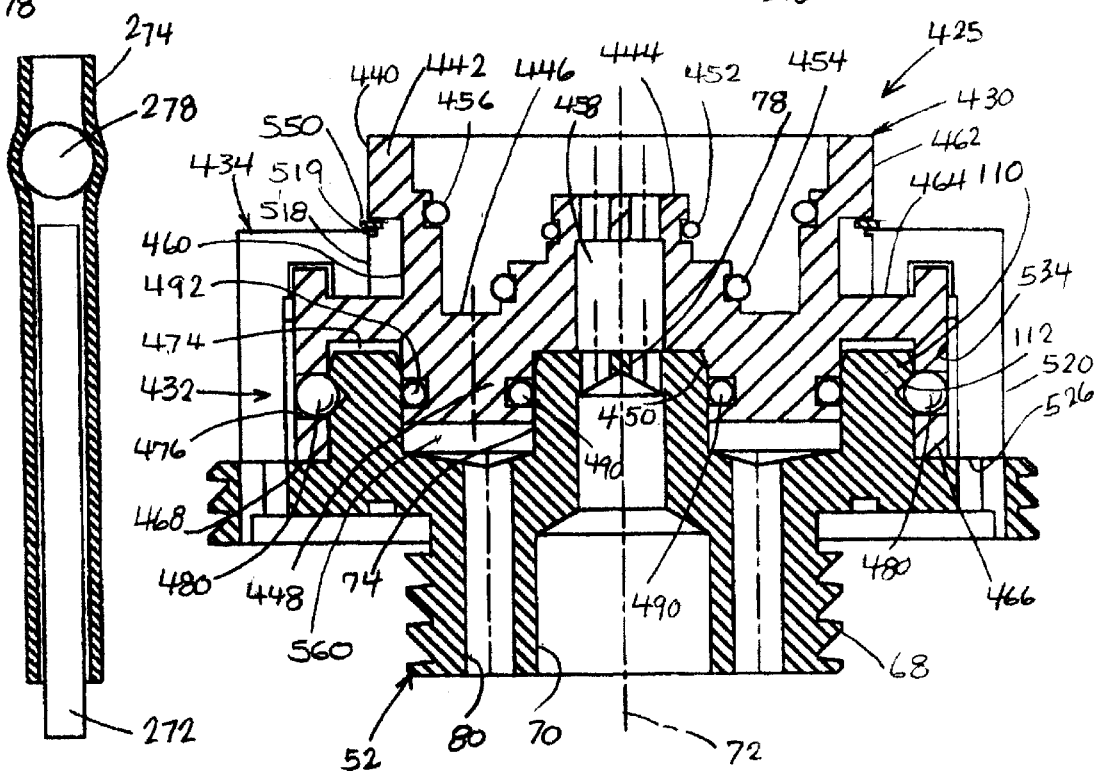
FIG. 12 is a longitudinal section of either end portion of the coil spring shown in FIG. 11.
FIG. 13 is a longitudinal section of a second no-coded embodiment of the quick-connect coupling of the present invention shown with the coupling members interfitted and latched.

After the extractor head 430 and the drum insert 52 are thusly interfitted, the latching sleeve 434 is rotated clockwise (from the top) about sixty degrees or one-sixth of a turn into its latching position (FIG. 13). Such rotation causes the bearing surfaces 534 to push the latching balls 480 into the latching groove 112 thereby to latch the coupling members 74 and 448 together. Rotation of the sleeve on the head is limited by the stop lug 470 engaging one of the ends 542 of the limit slot 540 so as to insure alignment and to indicate t and to indicate to the operator that latching has been achieved.

To uncouple the extractor head 430 from the drum insert 52, the latching sleeve 434 is rotated counterclockwise (from the top) about sixty degrees or one-sixth of a turn into its unlatched position (not shown). Again, engagement of the stop lug 470 with the opposite end 542 of the limit slot indicates to the operator that the unlatched position is reached. As such, the recesses 530 are opposite to the holes 476 and balls 480, thereby allowing the balls to move into the recesses and withdraw into their holes. The head can then be lifted off from the insert.

It will be understood from the foregoing that a very simple, yet highly effective, fluid coupling 425 has been provided. The coupling enables the extractor head 430 to be coupled and latched, and unlatched and uncoupled, without requiring any rotation of the extractor head relative to the drum insert. Yet the coupling allows swiveling of the head relative to the insert and the sleeve if necessary. Moreover, this coupling and uncoupling and latching and unlatching is achieved without any threaded or unthreading of the parts. The coupling can be entirely and effectively molded out of chemically-resistant plastic as described thus minimizing manufacturing costs. In addition, the head and sleeve are compatible with the same drum insert that is used with the multiple delivery lines involved with the first embodiment.

Although preferred embodiments of the present invention have been shown and described, various modifications, substitutions and equivalents may be used therein without departing from the spirit and scope of the invention. Accordingly, it is to be understood that the present invention has been described by way of illustration and not limitation.

What is claimed is:

1. A coupling comprising:
    first and second coupling members having fluent material passageways and being releasably axially movable into interfitted relationship with said passageways in fluid communication;
    latch members movable relative to the passageways without threading allowing the coupling members to be moved into interfitted relationship and latching the coupling members in such relationship, there being a first latch member movable radially of the passageways and a second latch member movable rotatably of the passageways; and
    interengaging member internally of the coupling precluding rotation of the second latch member in the intermitted and latched relationship of the coupling members.

2. The coupling of claim 1,
wherein said latch members allow such movement into interfitted relationship without rotation of the coupling members.

3. The coupling of claim 2,
wherein said latch members allow such movement into interfitted relationship without requiring rotation of the coupling members but permitting such rotation if the coupling members are subjected to relative rotational forces.

4. The coupling of claim 1,
wherein there are audible means independent of the engagement of the interengaging members for detecting whether the coupling members are in interfitted relationship.

5. The coupling of claim 1,
wherein there are tactile means independent of the engagement of the interengaging members for detecting whether the coupling members are in interfitted relationship.

6. The coupling of claim 1,
wherein the latch members include a latching receptacle radially related to the first latch member, one of the first latch member and receptacle being movable relative to the other between an interengaging latching position and a disengaged unlatched position; and
wherein the second latch member is movable between a latching position forcing the first latch member and the latching receptacle into latching position and an unlatched position allowing the first latch member and the latching receptacle to move into unlatched position.

7. The coupling of claim 6,
wherein the latching receptacle is an annular ring having a latching groove,
wherein the first latch member is a ball mounted for movement into and out of the groove between the latching and unlatched positions,
wherein the rotatable member is a sleeve having a latching recess and a bearing surface, and
wherein the sleeve is mounted for movement relative to the ball between a latching position forcing the ball into the groove and an unlatched position allowing the ball to withdraw from the groove onto the hole.

8. A coupling comprising:
first and second coupling members having fluent material passageways and being releasably axially movable into interfitted relationship with said passageways in fluid communication,
the first coupling member providing a latching ring having a latching groove circumscribing the passageways,
the second coupling member having a latching skirt circumscribing the latching ring and providing a plurality of latching holes extending radially of the passageway and lying in a common plane with the latching groove;
latching balls individually positioned in the latching holes for movement radially of the passageway between latching positions extending into the groove and unlatched positions withdrawn into the holes;
a latching sleeve movably mounted on the second coupling member in circumscribing relation to the balls and operable to enable the balls to move between their latched and unlatched positions upon movement of the sleeve relative to the second coupling member; and
interengaging members internally of the coupling precluding rotation of the sleeve in the interfitted and latched relationship of the coupling members.

9. The coupling of claim 8,
wherein the sleeve is rotatable on the latching ring to move the balls between their latched and unlatched positions.

10. The coupling of claim 9,
wherein the interengaging members preclude movement of the sleeve relative to the latching ring in the latching and unlatched positions.

11. The coupling of claim 10,
wherein the interengaging members include a lug on one of the sleeve and ring and a slot on the other of the sleeve and ring, the lug being movable in the slot and engageable with the opposite ends of the slot in the latched and unlatched positions thereby limiting movement of the sleeve.

12. The coupling of claim 8,
wherein there are a plurality of recesses in the sleeve interspersed with a plurality of bearing surfaces whereby upon rotation of the sleeve in one direction the bearing surfaces engage the balls and push them into the latching groove and upon rotation in the opposite direction the recesses are aligned with the balls and allow the balls to withdraw from the groove into their holes.

13. A coupling for enabling interconnection of only matching fluent material delivery and supply lines while preventing the inadvertent interconnection of mismatched lines notwithstanding the presence of a plurality of delivery and supply lines some of which are matched and some of which are mismatched, comprising:
first and second coupling members having fluent material passageways and being releasably axially movable into interfitted relationship with said passageways in fluid communication,
one of the coupling members being connectable to a supply line and the other coupling member being connectable to a delivery line; and
a latch mechanism including a first latch member movable axially and rotatably of the passageways without threading and a second latch member movable radially of the passageway, the first and second latch members also having interengaging coding members, said coding members allowing the coupling members to be moved into intermitted relationship only if the delivery and supply lines are matched and said latch mechanism latching the coupling members in such relationship.

14. The coupling of claim 13,
wherein said latch mechanism allows such movement into interfitted relationship without rotation of the coupling members.

15. The coupling of claim 13,
wherein there are means independent of visual inspection of the coupling or manually trying to separate the coupling members for detecting whether the coupling members are in interfitted relationship.

16. The coupling of claim 13,
wherein the first and second members including first and second key coding members and first and second latching members respectively on the first and second coupling members;
wherein one of the key coding members is movable axially of the passageway and rotatably relative to the other key coding member to enable movement of the coupling members into interfitted relationship;

wherein one of the latching members is movable radially of the passageway and the other latching member between a latching position when the coupling members are matched and interfitted and an unlatched position when the coupling members are mismatched and not interfitted; and wherein said one coding member moves said one latching member into latching position and blocks removal from such position when the coupling members are intermitted and wherein said one coding member allows movement of said one coding member into unlatched position and removes such blocking when the coupling members are mismatched and not interfitted.

17. The coupling of claim 16, wherein there is a spring resiliently axially urging said one key coding member axially of the passageway toward said other key coding member.

18. The coupling of claim 16, wherein said one coding member is a sleeve having at least one axially extending peg; and wherein said other coding member is a flange having at least one hole alignable with the peg for allowing the peg to fit into the hole in said interfitted relationship.

19. The coupling of claim 18, wherein said one coding member is the first coding member on the first coupling member; and wherein there is a coil spring interposed the sleeve and the first coupling member urging the sleeve toward the second coupling member.

20. The coupling of claim 18, wherein said sleeve has at least two diametrically located axially extending pegs; and wherein said flange has at least two diametrically located holes alignable with said diametrically located pegs.

21. The coupling of claim 18, wherein one of the coupling members has a first cylindrical wall providing a groove therein;

wherein the other coupling member has a second cylindrical wall circumscribing the first cylindrical wall and providing a bore extending through the wall radially of the passageways in alignment with the groove; and wherein at least one ball is disposed in the bore for movement into said latching position in the groove and said unlatched position removed from the groove.

22. The coupling of claim 21, wherein said one coding member is a sleeve circumscribing the second cylindrical wall and movable axially thereof between a retracted position exposing the ball and allowing it to move into its unlatched position and a latched position covering the ball, moving it into latching position, and blocking it from moving into unlatched position.

23. The coupling of claim 22, wherein the sleeve has a bearing surface that engages the ball in said latched position and a recessed surface spaced radially outwardly from the bearing surface that allows movement of the ball from its latched position into its unlatched position.

24. The coupling of claim 23, wherein there is an O-ring circumscribing said second cylindrical wall and in opposed relation to the recessed surface in said latched position.

25. The coupling of claim 23, wherein there are air passages in the sleeve and said one coupling member that register when the coupling members are in interfitted relationship and allow air to escape thereby indicating that the coupling members are in intermitted relationship.

26. A coupling for enabling interconnection of only matching fluent material delivery and supply lines while preventing the inadvertent interconnection of mismatched lines notwithstanding the presence of a plurality of delivery and supply lines some of which are matched and some of which are mismatched, comprising:

first and second coupling members having fluent material passageways and being releasably axially movable into interfitted relationship with said passageways in fluid communication, one of the coupling members being connectable to a supply line and the other coupling member being connectable to a delivery line;

a sleeve rotatably and axially movably mounted on the first coupling member;

key coding elements on the sleeve and the second coupling member for allowing the coupling members to be moved into interfitted relationship if the delivery and supply lines are matched;

a biasing device yieldably urging the sleeve in a predetermined direction so that the key coding elements can allow the coupling members to be moved into intermitted relationship if the delivery and supply lines are matched; and latches engageable by the sleeve when the key coding elements allow the coupling members to move into their interfitted relationship for latching the coupling members in their interfitted relationship but precluding such latching if the coupling members are unable to move into their interfitted relationship when the delivery and supply lines are mismatched.

27. The coupling of claim 26, wherein the latches include a latch receptacle in the second coupling member and at least one latching member mounted in the first coupling members and movable radially thereof into and out of the latch receptacle, said sleeve being movable into engagement with the latching member to push it into the receptacle when the key coding elements allow the coupling members to be moved into interfitted relationship.

28. The coupling of claim 27, wherein there are interengaging members on the sleeve and the first coupling member limiting movement of the sleeve in said predetermined direction relative to the first coupling member.

29. The coupling of claim 27, wherein the latching receptacle is an annular groove, and wherein the latches include a plurality of latching members movably mounted in the first coupling member for radial movement into and out of the groove.

30. The coupling of claim 29, wherein the latching members are balls.

31. The coupling of claim 29, wherein the sleeve has a bearing surface engageable with the latching member when the bearing surface is opposed to the groove for pushing the latching member into the groove; and wherein the sleeve also has a recessed surface axially spaced from but adjacent to the bearing surface and spaced radially outwardly from the bearing surface for allowing the balls to withdraw from the groove when the recessed surface is opposed to the groove.

32. The coupling of claim 26,
wherein the first coupling member has an air passage opening radially thereof; and
wherein the sleeve has a radial air vent movable into a registered position with the air passage when the coupling members are not interfitted thereby to release air from the vent and indicate that the coupling members are not interfitted and a non-registered position relative to the air passage thereby to preclude release of air from the vent and indicate that the coupling members are interfitted.

33. The coupling of claim 26,
wherein the interconnection of the coupling members and the sleeve does not involve any threads or threading.

34. A coupling for enabling interconnection of only matching fluent material delivery and supply lines while preventing the inadvertent interconnection of mismatched lines notwithstanding the presence of a plurality of delivery and supply lines some of which are matched and some of which are mismatched, comprising:
first and second cylindrical coupling members having fluent material passageways and being releasably axially movable into interfitted relationship with said passageways in fluid communication and the first coupling member circumscribing the second coupling member,
said coupling members being adapted for connection to a supply line and a delivery line, respectively,
the second coupling member having an outwardly facing circumferential groove,
the first coupling member having a plurality of radially extending openings coplanar with the groove when the coupling members are interfitted;
balls individually fitted in the openings and movable therein between latching positions extended into the groove and retracted positions withdrawn from the groove;
a key coding flange projecting radially from the second coupling member and having a plurality of axially extending coding holes;
a key coding sleeve axially and rotatably slideably mounted on the first coupling member and having a plurality of endwardly extending coding pegs in opposition to the coding flange and adapted upon axial movement toward the flange and rotation of the sleeve to fit into the coding holes when the number and location of the pegs corresponds to the number and location of the holes,
the sleeve also circumscribing the balls and pushing them into their latching positions in the grove when the pegs are fitted in the holes;
a biasing device interposed the first coupling member and the sleeve and yieldingly urging the sleeve axially toward the coding flange; and
a valve in the first coupling member movable between a closed position when the coupling members are not interfitted and an open position when the coupling members are interfitted, interfitting of the coupling members causing the second coupling member to move the valve into open position.

35. The coupling of claim 34,
wherein the coding pegs and holes include a pair of said pegs and matching holes at one location along the circumference of the sleeve and flange and a single peg and matching hole at a diametrically opposite location from said pair of pegs and holes.

36. The coupling of claim 34,
wherein the coding pegs and holes include a predetermined pattern of pegs and matching holes.

37. The coupling of claim 34,
wherein the interconnection of the coupling members and the sleeve does not involve any threads or threading.

38. The coupling of claim 34,
wherein the second coupling member provides a fluid-tight separation of the key coding flange and sleeve, the balls, and the spring from the passageways.

39. The coupling of claim 34,
wherein the coupling members, the valve means, the sleeve, the balls, and the flange are plastic.

40. The coupling of claim 34,
wherein the first coupling member is an extractor head,
wherein the second coupling member is a drum insert,
wherein the fluent material passageways are for the passage therethrough of the contents of a drum to which the insert is connected to the supply lines to which the extractor head is connected,
wherein the extractor head and drum insert have air passageways that are aligned when the head and insert are interfitted for allowing the passage of air into the drum as the contents thereof are removed;
wherein the first coupling member has an indicator air passage opening endwardly and radially thereof; and
wherein the sleeve has a radial air vent movable into a registered position with the radial opening of the indicator air passage when the coupling members are not interfitted thereby to release air from the vent and indicate that the coupling members are not interfitted and a non-registered position relative to the indicator air passage thereby to preclude release of air from the vent and indicate that the coupling members are interfitted.

41. A coupling comprising:
first and second coupling members having fluent material passageways and being releasably axially movable into interfitted relationship with said passageways in fluid communication; and
latch members associated with the coupling members and including a first latch member movable axially and rotatably, and a second latch member movable radially, of the passageways without threading, the first and second latch members also having engageable, matching coding members, said matching coding members upon engagement allowing the coupling members to be moved into interfitted relationship, and said latching members releasably retaining the coupling members in such relationship.

42. The coupling of claim 41,
wherein a valve is in one of the coupling members and is movable between a closed position when the coupling members are not interfitted and an open position when the coupling members are interfitted, interfitting of the coupling members causing the other coupling member to move the valve into open position.

43. A coupling for enabling interconnection of only matching fluent material delivery and supply lines while preventing the inadvertent interconnection of mismatched lines notwithstanding the presence of a plurality of delivery and supply lines some of which are matched and some of which are mismatched, comprising:

first and second coupling members having fluent material passageways and being releasably axially movable into interfitted relationship with said passageways in fluid communication, said coupling members having means for connecting one of the coupling members to a supply line and the other coupling member to a delivery line; and latch members one of which is movable axially and rotatably of the passageways without threading and another of which is movable radially of the passageways, the latch members allowing the coupling members to be moved into interfitted relationship and latching the coupling members in such relationship only if the delivery and supply lines are matched.

44. The coupling of claim 43, wherein a valve is in one of the coupling members and is movable between a closed position when the coupling members are not interfitted and an open position when the coupling members are interfitted, interfitting of the coupling members causing the other coupling member to move the valve into open position.

45. A coupling for enabling interconnection of only matching fluent material delivery and supply lines while preventing the inadvertent interconnection of mismatched lines notwithstanding the presence of a plurality of delivery and supply lines some of which are matched and some of which are mismatched, comprising:

first and second coupling members having fluent material passageways and being releasably axially movable into interfitted relationship with said passageways in fluid communication, one of the coupling members being connectable to a supply line and the other coupling member being connectable to a delivery line;

a sleeve rotatably and axially movably mounted on the first coupling member;

key coding members on the sleeve and the second coupling member that allow the coupling members to be moved into interfitted relationship if the delivery and supply lines are matched;

a biasing member yieldably urging the sleeve in a predetermined direction so that the key coding members can allow the coupling members to be moved into interfitted relationship if the delivery and supply lines are matched; and latch members engageable by the sleeve when the key coding members allow the coupling members to move into their interfitted relationship for latching the coupling members in their interfitted relationship but precluding such latching if the coupling members are unable to move into their interfitted relationship when the delivery and supply lines are mismatched.

46. The coupling of claim 1, wherein the visibility of the interengaging members exteriorly of the coupling is obstructed by the second latch member.

47. The coupling of claim 1, wherein the interengaging members include a projection extending axially of the passageways and mounted on one of the first coupling member and the second latch member, the interengaging members also including a stop surface extending axially of the passageways and mounted on the other of the first coupling member and the second latch member, the projection and the stop surface being movable relative to each other when the second latch member moves rotatably of the passageways, engagement of the projection and the stop surface establishing an interfitted and latched relationship of the coupling members, the projection and the stop surface being located inside the coupling radially inwardly of the outer periphery of the second latch member.

48. The coupling of claim 8, wherein one of the interengaging members is a coding peg on the sleeve and another of the interengaging members is a stop surface that surrounds a coding hole in the first coupling member.

49. The coupling of claim 45, wherein the sleeve has an annular skirt circumscribing the key coding members in the interfitted and matched relationship of the coupling members.

50. The coupling of claim 13, wherein there is a skirt circumscribing and concealing the latch mechanism when the coupling members are in their interfitted and matched relationship.

51. The coupling of claim 13, wherein the latch mechanism has an external peripheral surface, wherein the latch mechanism includes first and second latch members with the first latch member being movable radially of the second latch member and with the second latch member being movable axially of the first latch member, and wherein the second latch member extends axially endwardly of the first latch member in radially inwardly spaced relation to the peripheral surface of the latch mechanism.

52. A coupling comprising:

first and second coupling members having fluent material passageways and being releasably axially movable into interfitted relationship with said passageways in fluid communication;

latch members movable radially and rotatably of the passageways without threading for allowing coupling members to be moved into interfitted relationship and for latching the coupling members in such relationship, the coupling members being initially interfitted and thereafter latched when the coupling members are moved towards their coupled relationship; and means providing a first signal when the coupling members are interfitted and a second signal when the coupling members are latched.

53. A coupling comprising:

first and second coupling members having fluent material passageways and being releasably axially movable into interfitted relationship with said passageways in fluid communication;

latch members movable radially and rotatably of the passageways without threading for allowing coupling members to be moved into interfitted relationship and for latching the coupling members in such relationship, the coupling members being initially interfitted and thereafter latched when the coupling members are moved towards their coupled relationship, the sleeve and said one coupling member having air passages therein that are first in registration and then not in registration when the coupling members are respectively first interfitted and then in matched relationship , the presence of air exiting from the registering passages providing a first signal when the coupling members are interfitted and the absence of exiting air when the passages are not in registration providing a second signal when the coupling members are latched.

54. A quick-connect coupling for enabling interconnection of only matching fluent material delivery and supply lines while preventing the inadvertent interconnection of mismatched lines notwithstanding the presence of a plurality of delivery and supply lines some of which are matched and some of which are mismatched, comprising:

first and second cylindrical coupling members having fluent material passageways and being releasably axially movable into interfitted relationship with said passageways in fluid communication and the first coupling member circumscribing the second coupling member, said coupling members having means for connecting one of the coupling members to a supply line and the other coupling member to a delivery line, the second coupling member having an outwardly facing circumferential groove, the first coupling member having a plurality of radially extending openings coplanar with the groove when the coupling members are interfitted;

balls individually fitted in the openings and movable therein between latching positions extended into the groove and retracted positions withdrawn from the groove;

a key coding flange projecting radially from the second coupling member and having a plurality of axially extending coding holes;

a key coding sleeve axially and rotatably slideably mounted on the first coupling member and having a plurality of endwardly extending coding pegs in opposition to the coding flange and adapted upon axial movement toward the flange and rotation of the sleeve to fit into the coding holes when the number and location of the pegs corresponds to the number and location of the holes, the sleeve also circumscribing the balls and pushing them into their latching positions in the grove when the pegs are fitted in the holes; and a biasing device interposed the first coupling member and the sleeve and yieldingly urging the sleeve axially toward the coding flange.

55. A method for enabling interconnection of only matching fluent material delivery and supply lines with a coupling while preventing the inadvertent interconnection of mismatched lines notwithstanding the presence of a plurality of delivery and supply lines some of which are matched and some of which are mismatched, wherein the coupling includes first and second coupling members having fluent material passageways, one of the coupling members being connected to the supply line and the other coupling member being connected to the delivery line, and wherein a latch mechanism on the couplings includes a first latch member movable axially and rotatably of the passageways, a second latch member movable radially of the passageways, and a third latch member engageable with the first latch member if the supply and delivery lines are matched, the first latch member being axially movable and rotatable to determine if matched engagement can occur, the third latch member being engageable with the second latch member only if the first and third latch members are engaged, the first latch member moving the second latch member into engagement with the third latch member when the first and third latch members are moving into engagement, comprising the steps of:

moving the first latch member in one direction axially of the passageways to allow radially outward movement of the second latch member;

moving one of the coupling members relative to the other coupling member until the coupling members are interfitted; and moving the first latch member in the opposite direction axially of the passageways and if necessary also rotating the first latch member to determine if a match exists and if so moving the first and third latch members into engagement and thereby also causing the first latch member to move the second latch member radially inwardly into engagement with the third latch member.

56. The method of claim 55, including the step of:

rotating the first latch member to determine if a match can be made after the coupling members are interfitted and said passageways are in fluid communication.

57. A coupling comprising:

first and second coupling members having fluent material passageways and being releasably axially movable into interfitted relationship with said passageways in fluid communication;

latch members movable relative to the passageways without threading allowing the coupling members to be moved into interfitted relationship and latching the coupling members in such relationship, there being a first latch member movable radially of the passageways and a second latch member movable both axially and rotatably relative to the couplings; and interengaging members internally of the coupling limiting rotation of the second latch member in the interfitted and latched relationship of the coupling members.

58. A coupling comprising:

first and second coupling members having fluent material passageways and being releasably axially movable into interfitted relationship with said passageways in fluid communication, the first coupling member providing a latching ring having a latching groove circumscribing the passageways, the second coupling member having a latching skirt circumscribing the latching ring and providing a plurality of latching holes extending radially of the passageway and lying in a common plane with the latching groove;

latching balls individually positioned in the latching holes for movement radially of the passageway between latching positions extending into the groove and unlatched positions withdrawn into the holes;

a latching sleeve axially and rotatably movably mounted on the second coupling member in circumscribing relation to the balls and operable to enable the balls to move between their latched and unlatched positions upon movement of the sleeve relative to the second coupling member; and interengaging members internally of the coupling limiting rotation of the sleeve in the interfitted and latched relationship of the coupling members.

* * * * *